(12) United States Patent
Stamm et al.

(10) Patent No.: US 6,702,215 B2
(45) Date of Patent: Mar. 9, 2004

(54) REPOSITIONABLE MEMORY ELEMENT IN A SINGLE REEL TAPE CARTRIDGE

(75) Inventors: Stephen Stamm, Fort Lupton, CO (US); Satya Mallick, Milford, MA (US); Chan Kim, Franklin, MA (US)

(73) Assignee: Quantum Corporation, San Jose, CA (US)

(*) Notice: Subject to any disclaimer, the term of this patent is extended or adjusted under 35 U.S.C. 154(b) by 0 days.

(21) Appl. No.: 10/189,158

(22) Filed: Jul. 3, 2002

(65) Prior Publication Data

US 2004/0004145 A1 Jan. 8, 2004

(51) Int. Cl.[7] ............................................. G11B 23/107
(52) U.S. Cl. ........................ 242/348; 242/357; 360/132
(58) Field of Search ................................ 242/348, 357; 360/132

(56) References Cited

U.S. PATENT DOCUMENTS

| | | | | |
|---|---|---|---|---|
| 5,610,789 | A | * 3/1997 | Miller | 360/132 |
| 5,852,534 | A | 12/1998 | Ozue et al. | |
| 6,043,948 | A | 3/2000 | Takayama | |
| 6,075,669 | A | 6/2000 | Takayama | |
| 6,088,182 | A | 7/2000 | Taki et al. | |
| 6,195,007 | B1 | 2/2001 | Takayama et al. | |
| 6,301,067 | B1 | 10/2001 | Takayama | |
| 6,304,416 | B1 | 10/2001 | McAllister et al. | 360/132 |
| 6,452,745 | B1 | * 9/2002 | Shiga et al. | 360/132 |
| 6,481,658 | B1 | * 11/2002 | Shiga et al. | 242/347 |
| 2003/0128467 | A1 | * 7/2003 | Blair et al. | 360/132 |

FOREIGN PATENT DOCUMENTS

| | | |
|---|---|---|
| EP | 0 978 841 | 2/2000 |
| EP | 0 987 710 | 3/2000 |
| EP | 0 991 071 | 4/2000 |
| EP | 1 008 987 | 6/2000 |
| EP | 1 017 057 | 7/2000 |
| EP | 1 041 562 | 10/2000 |
| JP | 09-134256 | 2/1997 |
| JP | 09-134584 | 5/1997 |
| JP | 09-134585 | 5/1997 |
| JP | 09-237474 | 9/1997 |
| JP | 10-064185 | 3/1998 |
| JP | 10-293992 | 11/1998 |
| JP | 11-031376 | 2/1999 |
| JP | 11-224477 | 8/1999 |
| JP | 2000-048541 | 2/2000 |
| JP | 2000-057662 | 2/2000 |
| JP | 2000-082277 | 3/2000 |
| JP | 2000-090640 | 3/2000 |
| JP | 2000-090641 | 3/2000 |
| JP | 2000-090642 | 3/2000 |
| JP | 2000-100119 | 4/2000 |

(List continued on next page.)

OTHER PUBLICATIONS

Paper entitled "Development of a Memory Label System for Consumer VCRs" dated Oct. 2, 1998, prepared by Yasuhisa Nakajima and Takamichi Mitsuihashi for the Development Division, Home A&V Products Company, Sony Corporation.

*Primary Examiner*—Kathy Matecki
*Assistant Examiner*—Evan Langdon
(74) *Attorney, Agent, or Firm*—Morrison & Foerster LLP

(57) ABSTRACT

A tape cartridge including a repositionable memory element is provided. The tape cartridge includes a cartridge housing that includes a supply reel having a magnetic tape media spooled thereon and a memory element to communicate with a tape cartridge handling device via a wireless connection. In one embodiment of the invention, the memory element is connected to the cartridge housing using an attachment apparatus that provides a detachable connection with the cartridge housing. The attachment apparatus includes a positioning mechanism for repositioning the memory element following attachment to the tape cartridge housing to align the memory element with a mating transceiver in the tape-handling device to facilitate communication exchange therebetween.

17 Claims, 16 Drawing Sheets

FOREIGN PATENT DOCUMENTS

| | | |
|---|---|---|
| JP | 2000-113640 | 4/2000 |
| JP | 2000-173128 | 6/2000 |
| JP | 2000-173237 | 6/2000 |
| JP | 2000-173242 | 6/2000 |
| JP | 2000-173243 | 6/2000 |
| JP | 2000-173244 | 6/2000 |
| JP | 2000-182322 | 6/2000 |
| JP | 2000-182357 | 6/2000 |
| JP | 2000-235744 | 8/2000 |
| JP | 2000-235774 | 8/2000 |
| JP | 2000-268443 | 9/2000 |
| JP | 2000-285546 | 10/2000 |
| WO | WO 97/02566 | 1/1997 |
| WO | WO 97/17703 | 5/1997 |
| WO | WO 00/17880 | 3/2000 |
| WO | WO 00/38188 | 6/2000 |

* cited by examiner

REPOSITIONABLE MEMORY ELEMENT IN A SINGLE REEL TAPE CARTRIDGE

FIELD OF THE INVENTION

The invention is related to the field of tape cartridges having memory elements, and in particular, to a tape cartridge having a memory element that is adjustable and/or repositionable relative to the tape cartridge housing to align the memory element with a mating transceiver in a tape-handling device to facilitate communication exchange therebetween.

BACKGROUND OF THE INVENTION

Digital data is stored on tape cartridges that include a magnetic tape media wound between a pair of tape reels as data is transferred to or from the media. In the art of data storage, the physical space required to store data on tape cartridges is an important concern. To conserve space, tape-handling devices, e.g. tape drives, often use a single reel tape cartridge design, which utilizes a supply reel located within a removable tape cartridge and a take-up reel located within the tape-handling device.

In addition to the tape media, tape cartridges often include a memory element, e.g. an integrated circuit chip, for storing information related to the cartridge and/or its contents that is more readily accessible by the tape-handling device. The communication between the tape-handling device and the memory element is primarily provided by one of two methods. According to a first method, the memory element is mounted to the cartridge in a manner that provides contact between one or more electrical conductors connected to the memory element and mating conductors within the tape-handling device. This is commonly referred to in the art as a "contact" memory element design. In this case, when a cartridge including the memory element is inserted into the tape-handling device, a read/write device makes contact with the memory element conductors. The read/write device via the conductors is then able to provide power to the memory element and read and/or write data to the memory element.

According to a second method, a non-contact interface, such as a Radio Frequency ("RF") link, between the memory element and an RF device, e.g. RF transceiver, in the tape-handling device is utilized. In this case, the memory element may be read from and written to by the RF transceiver, which additionally provides power to the memory element eliminating the need for physical contact between the memory element and the transceiver. This is commonly referred to in the art as a "contactless" chip design.

Unfortunately, it is a problem in the art of cartridge memory elements to provide a single memory element that may be accessed by a variety of tape-handling devices having a variety of architectures, e.g., tape drives and tape library pickers. For instance, in the case of a tape library system, it is desirable to read a memory element from one face, e.g., a side of the cartridge, when the cartridge is in the tape drive, while being able to read the memory element from another face, e.g., the front of the cartridge, when the cartridge is located in the library storage rack.

One conventional cartridge system addresses this problem, in the case of "contactless" memory elements, by providing a single memory element internally mounted within the cartridge. The memory element is oriented at substantially a forty-five degree angle to each of the front and bottom cartridge faces so that the contents may be accessed either from the front or bottom of the cartridge. According to this approach, however, the memory element, and specifically the antenna portion, is positioned further from the drive transceiver than would be the case if the memory element is mounted flush with one of the cartridge sides. In this regard, the additional distance when the memory element is positioned at a forty-five degree angle may be defined by the average distance of the memory element from the cartridge sides. Since the power received by the memory element transceiver rapidly drops off as the transceiver distance is increased, the method results in an increased RF transmission power that further results in an increase in electromagnetic interference within the drive. The antenna is also oriented at an angle relative to the tape drive transceiver, reducing the effective size of the communication interface from the perspective of the tape drive transceiver. Additionally, if the memory element and tape drive transceiver are not properly aligned, communication exchange is affected and often not possible.

Another problem in the art of cartridge memory elements is that the memory elements are typically permanently attached to the cartridge and cannot be removed without cartridge damage or total destruction of the cartridge. In this regard, the memory elements are typically integrated circuit chips formed on a brittle substrate material, such as a silicon wafer, that may be damaged if the cartridge is dropped or roughly handled, thereby rendering an otherwise operational cartridge non-operational.

In addition, a related problem with such designs, e.g. permanently fixed cartridge memory elements, is that the memory element is mandatory for proper operation of the cartridge in the drive. If the memory element becomes damaged, the drive is unable to access the cartridge, even to read or write data to the tape media, thus rendering the cartridge useless.

Finally, it is often desirable in the art of tape cartridges to have the ability to configure existing cartridges in the marketplace with a memory element. In this regard, there are millions of tape cartridges presently in use, that do not include a memory element, but that because of hardware upgrades etc., are being utilized with tape-handling devices configured with the capability to utilize such memory elements. Furthermore, not all customers desire tape cartridges with a memory element, primarily because of the added cost of such cartridges. Thus, it is desirable to have a tape cartridge that will operate regardless of whether or not a memory element is included, and have the ability to retrofit the same tape cartridge with a memory element at some point in the future, e.g. the memory element may be added to the cartridge at any time and the cartridge is functional in a tape drive with or without the memory element.

SUMMARY OF THE INVENTION

In view of the foregoing, a broad object of the present invention is to improve communication between a memory element in a tape cartridge and the tape cartridge handling device. Another object of the present invention is to provide a memory element that may be easily and efficiently added to a tape cartridge subsequent to manufacturing of the cartridge (e.g. the memory element may be added even after the sale and use of the cartridge by a customer). Another object of the present invention is to provide a tape cartridge that includes the option of having a memory element, but that is functional in a tape drive with or without the inclusion of the memory element. Another objective of the present invention is to provide for the attachment of a memory element to a tape cartridge in a manner whereby the memory element is easily removable from the cartridge, e.g. in the event of damage the memory element is replaceable. Yet, another object of the present invention is to provide a method and apparatus for repositioning a memory element in a tape cartridge relative to a mating tape-handling device transceiver, e.g. to align the memory element and transceiver to facilitate communication exchange between the memory element and tape-handling device.

In relation to a tape cartridge according to the present invention, each of the various aspects discussed in more detail below generally includes a cartridge housing. At least one supply reel that includes a magnetic tape media spooled thereon is rotatably connected within the cartridge housing. The tape cartridge generally includes a memory element associated with the cartridge housing to communicate with a tape cartridge handling device via a wireless connection. For instance, the memory element may be a radio frequency memory element that includes a transceiver to exchange information with a corresponding transceiver located in the tape-handling device. In this regard, the memory element may use induction, such as using magnetic fields, to couple power to the memory element. Further in this regard, the memory element may use induction to exchange information between the memory element and the tape-handling device in a "contactless" manner.

In accordance with one aspect of the present invention, the memory element includes an antenna having a nonplanar configuration. In this regard, the antenna may include a first portion in a first plane and a second portion in a second plane that is disposed at an angle relative to the first plane. The antenna is operative for communicating with a tape handling device transceiver for at least one of reading (receiving) and writing (transmitting) operations. Such an antenna may be formed, for example, using a flex circuit or otherwise using circuitry formed on a nonplanar substrate or on a planar substrate that is subsequently re-formed into a nonplanar configuration. The nonplanar antenna can be used to accommodate a variety of interface configurations and to improve communications (or reduce the required communication power levels) with the tape handling device transceiver, e.g., by reducing the interface distance.

According to another aspect of the present invention, a tape cartridge includes a single antenna that defines a small angle interface with at least two faces of a cartridge. As noted above, it is desirable to dispose an antenna at a small angle relative to a cartridge face in order to optimize communication between the cartridge and tape-handling device. It is further desirable to accommodate such communication via different cartridge faces and to enable such communication via a single antenna in order to reduce parts and simplify construction and operation. In accordance with this aspect of the present invention, an antenna is mounted in a cartridge such that a first portion of the antenna defines a first communication interface (e.g., normal to a communication transmission pathway) at a first angle of less than forty-five degrees relative to a first face of the cartridge and a second portion of the antenna defines a second communication interface at a second angle of less than forty-five degrees relative to a second face of the cartridge. For example, the antenna may be curved, folded or otherwise formed into a nonplanar configuration. The first and second cartridge faces are preferably adjacent faces, e.g., front and side faces, top and side faces, bottom and side faces, back and side faces, top and front faces, bottom and front faces, top and back faces or bottom and back faces. It is generally desirable from a communications standpoint to make the first and second angles at or close to 0°. However, manufacturing limitations, other cartridge structure, and tolerances may result in practical designs having some nonzero angle. In this regard, the first and second angles are preferably less than thirty degrees and more preferably less than ten degrees. The first and second angles may be different from one another.

According to another aspect of the present invention, a folded antenna is mounted on a cartridge for multiple (two-or-more) face communication with tape handling devices. The antenna includes a first substantially planar region and a second substantially planar region separated by a fold region. The fold region may define a substantially linear fold but, more practically, may include some curvature. In one implementation, the antenna is folded at a substantially right angle to allow for optimized communication interfaces via two adjacent cartridge faces.

According to a still further aspect of the present invention, a tape cartridge memory element includes first and second non-coplanar antenna portions supported on a common support structure for interconnection to a cartridge housing. The first and second antenna portions may be different portions of a single functional antenna or may be provided by way of separate (i.e., separately operable) antennae. In this regard, the support structure may support the first antenna portion such that it is substantially flush with a first cartridge face and a second antenna portion such that it is substantially flush with a second cartridge face. It will be appreciated that the common support structure may simplify assembly and alignment.

In connection with the various aspects described above, first and second antenna portions (of one or more antennae) may be directly fabricated in the desired nonplanar configuration. However, to simplify construction, a preferred method for constructing the memory element involves forming the first and second antenna portions in a substantially planar configuration and then re-forming the antenna portions into a nonplanar configuration. Thus, in one implementation, the first and second antenna portions may be formed as a flex circuit that is folded into a mating recess of a cartridge. In another implementation, such a flex circuit may be mounted on a rigid structure that is in turn mounted to the cartridge housing. In yet another implementation, the antenna may be fabricated on a more rigid substrate that is subsequently formed into the desired nonplanar configuration.

According to another aspect of the present invention, a detachably mounted memory element is provided. In one embodiment of the tape cartridge, the memory element includes a predetermined geometry configured to slidably mate with a predetermined geometry in the cartridge housing in a detachable manner. More particularly, the memory element may be externally attached to the tape cartridge housing using a conventional recess for holding a label or bar code. Advantageously, the inclusion of the memory element in the label recess does not preclude also including the label or bar code in the same and allows for separately adding and removing of the label and memory element. In this manner, the memory element may be added to tape cartridges that were not originally designed to include a memory element and/or a memory element may be removed/replaced without removing or destroying the label or otherwise damaging the cartridge.

In another embodiment of the tape cartridge, an attachment apparatus is provided to detachably connect the memory element to the tape cartridge housing. The attachment apparatus includes a support structure for the memory element. In this characterization, the support structure includes at least one connector configured to detachably mate with the cartridge housing. More particularly, a pair of connectors may be included that mate with a pair of features formed in the tape cartridge housing via a detachable snap connection. In this regard, an aperture is also provided in the tape cartridge housing for receipt of the attachment apparatus, which fits into and substantially fills the aperture when mounted therein. In this regard, the memory element may be connected to the support structure, so that the memory element is externally located or internally located relative to the tape cartridge housing. In other words, depending on how the memory element is connected to the support structure, the memory element is externally exposed or internally housed relative to the cartridge housing.

In another embodiment of the tape cartridge, where the memory element is internally housed in the tape cartridge housing, the memory element may be connected to the support structure in a substantially perpendicular relation so that when the attachment apparatus is inserted into the aperture in the cartridge housing, the memory element is disposed within the cartridge housing in parallel relation to the connectors. In this characterization, the attachment apparatus may also include a tuning mechanism that permits positioning of the memory element within the tape cartridge from a position external to the cartridge housing after the memory element is connected to the housing. It should be noted, however, that the tuning mechanism is not necessary to the mounting of the memory element internal to the cartridge housing by the attachment apparatus, but merely adds an additional feature to the attachment apparatus. Where the tuning mechanism is included, it permits a user to tune or reposition the memory element, after attachment to the cartridge housing, to align the memory element with a read/write device, e.g. a transceiver, in a tape-handling device. The tuning mechanism may include a rotational member having a proximal end disposed toward the support structure of the attachment apparatus and a distal end connected to the memory element. In this regard, the proximal end is accessible by a user for application of a rotational force to achieve the internal repositioning of the memory element. The tuning mechanism may further include a spindle body disposed between the proximal end and the distal end. The spindle body releasably secures the rotational member to the support structure so that once a desired position is achieved; the memory element is securable to the support structure in that position. Further, in this regard, the attachment apparatus may also include an indicator to provide position information to the user during the repositioning of the memory element in the cartridge. Advantageously, this permits use of the memory element by tape-handling devices having different architectures, and specifically, different locations of the mating transceiver within the tape-handling device.

According to another aspect of the present invention, a memory element that is partially internally mounted and partially externally exposed relative to the cartridge housing is provided. In accordance with this aspect, the memory element is formed at a substantially ninety-degree angle so that at least a portion of the memory element is externally exposed relative to the cartridge housing. In this characterization, the memory element may be accessed by a read/write device, e.g. transceiver, within the tape-handling device that is positioned adjacent to one of a first or second side of the cartridge housing. Advantageously, such a cartridge is usable in tape-handling devices that have a variety of architectures. Additionally, the memory element is positioned in the closet proximate location to the tape-handling device transceiver to facilitate efficient information exchange with a minimum amount of power resulting in a minimum amount of electromagnetic interference.

In another embodiment, the memory element may be internally housed within a wall of the cartridge housing. In this regard, access to the memory element may be provided from a side or bottom of the cartridge housing for replacement of the memory element. Further, in this regard, at least a portion of the memory element may be externally exposed relative to the cartridge housing to facilitate the communication exchange with a tape-handling device transceiver.

Another feature of the present invention that may be incorporated into one or more of the above embodiments is the use of a memory blank. The memory blank serves as a placeholder for the memory element and attachment apparatus to permit addition of a memory element in a cartridge subsequent to manufacturing of the cartridge. The memory blank is essentially the attachment apparatus without the memory element attached thereon. Advantageously, this permits an efficient method for retrofitting tape cartridges with a memory element at a latter date by simply replacing the memory blank with an attachment apparatus including the memory element.

According to another aspect of the present invention, a method for providing a memory in a tape cartridge is provided. The method includes at least the steps of connecting a memory element to a tape cartridge housing in a detachable manner and exchanging information between the memory element and a tape-handling device via a wireless connection. Various refinements exist of the features noted in relation to the subject method. Further features may also be incorporated into the subject method to form multiple examples of the present invention. These refinements and additional features will be apparent from the following description and may exist individually or in any combination. For instance, the memory element may be disposed on the attachment apparatus according to the above-described embodiments or be configured to fit into a predetermined geometry on the tape cartridge.

In another implementation of the present method, the inventive method may also include the step of tuning the memory element subsequent to attachment to the tape cartridge housing. The tuning step may include the use of the above-described tuning mechanism to position the memory element relative to the cartridge housing to facilitate communication exchange.

Numerous additional features and advantages of the present invention will become apparent to those skilled in the art upon consideration of the further description that follows.

DETAILED DESCRIPTION

Reference will now be made to the accompanying drawings, which at least assist in illustrating the various pertinent features of the present invention. In this regard, the following description of a tape-handling device is presented for purposes of illustration and description. Furthermore, the description is not intended to limit the invention to the form disclosed herein. Consequently, variations and modifications commensurate with the following teachings, and skill and knowledge of the relevant art, are within the scope of the present invention. The embodiments described herein are further intended to explain the best modes known of practicing the invention and to enable others skilled in the art to utilize the invention in such, or other embodiments and with various modifications required by the particular application (s) or use(s) of the present invention.

Tape Handling System

Figure 1:
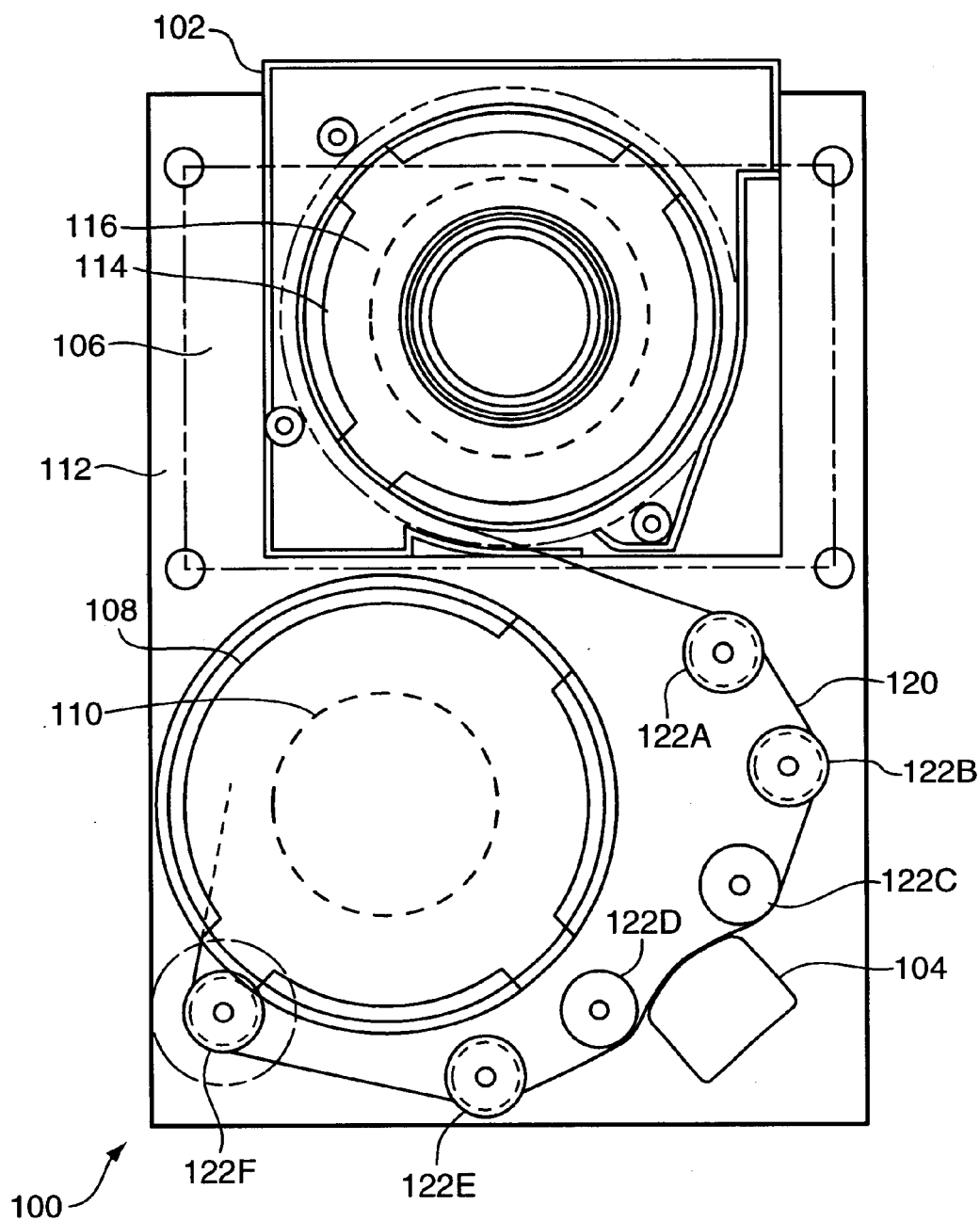
FIG. 1 illustrates an example of a tape-handling device and tape cartridge employing the principles of the present invention.

FIG. 1 depicts an example of a tape-handling device, namely tape drive 100, for use with a tape cartridge, namely tape cartridge 102, according to the present invention. The tape drive 100 includes a tape head 104, a tape cartridge receiver 106, and an internal take-up reel 108 driven by a take-up reel drive motor 110. These elements are contained within a housing, typically including a base 112 and top cover portion (not shown). The tape cartridge 102 includes a supply reel 114 having magnetic tape media 116 spooled thereon. The tape media 116 is of a predetermined particular type and is provided to the tape drive 100 by insertion of the tape cartridge 102 into the cartridge receiver 106. After insertion of the tape cartridge 102, an automatic loading process is performed in the tape drive 100. The loading process is representative of connecting, e.g. through a buckle connection, a tape cartridge leader 118, connected to the tape media 116, and a take-up leader 120, connected to the take-up reel 108. After connection of the tape cartridge leader 118 and take-up leader 120, the tape media 116 is spooled off of the cartridge supply reel 114 onto the take-up reel 108 via the tape path defined by guide rollers 122A–F.

Tape Cartridge Having Detachable External Memory Element

Figure 2:
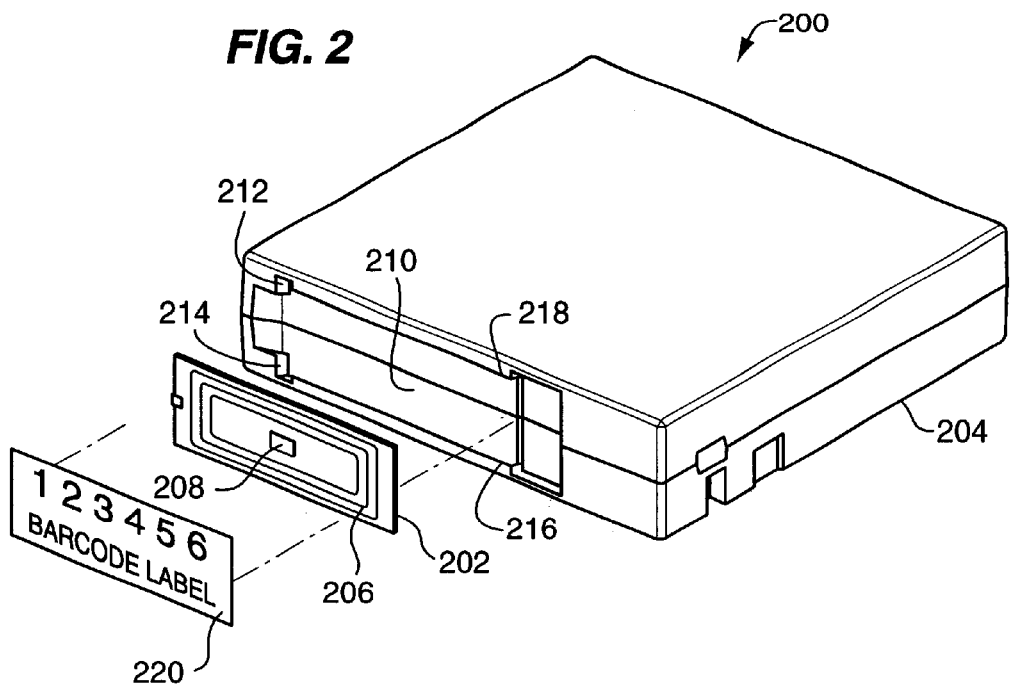
FIG. 2 is an assembly view illustrating an example of a tape cartridge including a memory element according to the principles of the present invention.
Figure 3:
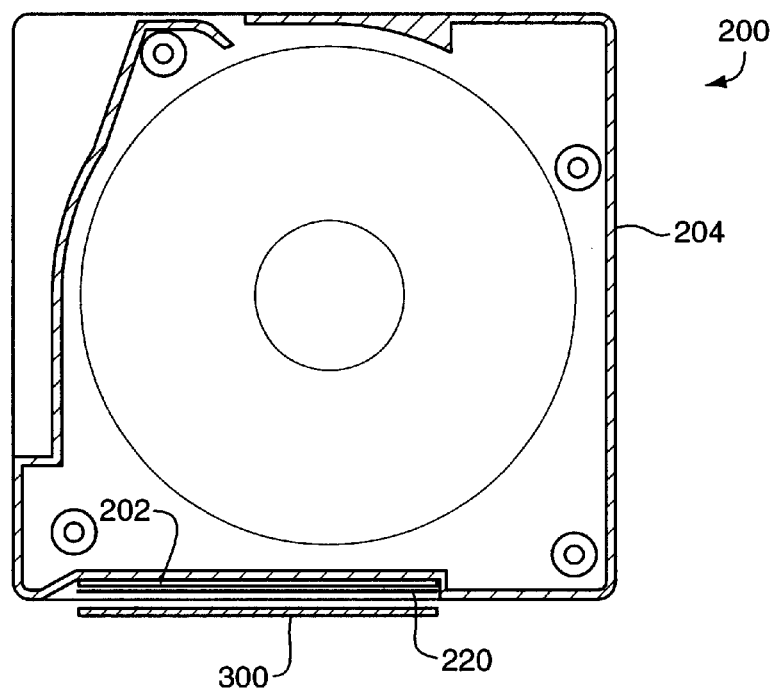
FIG. 3 is a top view of the tape cartridge of FIG. 2 in communication with a tape-handling device.

Referring to FIGS. 2 and 3, there is shown one embodiment of the tape cartridge 102, namely tape cartridge 200 including a memory element 202. In this example of the present invention, the memory element 202 is mountable external to the cartridge housing 204 of the tape cartridge 200. The memory element 202 may be externally mounted at any appropriate location on the tape cartridge 200 to provide a wireless exchange of information with a tape-handling device, such as tape drive 100. In one exemplary example, the memory element 202 is of a predetermined geometry to fit into a predetermined geometric recess 210 in the tape cartridge housing 204. The recess 210 is often included on tape cartridges, such as cartridge 200, for placement of a cartridge label or bar code, such as label 220. In this regard, the memory element 202 is constructed in a dimension that permits insertion of the memory element 202 into the recess 210. Specifically, the memory element 202 slides into notches, 212 and 214, so that the memory element 202 is detachably secured within opposing grooves, 216 and 218, of the recess 210. Alternatively, however, the memory element 202 may be permanently secured within the recess 210 or at other locations on the cartridge housing 204 by any suitable means, such as by an adhesive or other attachment method.

FIG. 3 illustrates a top view of the tape cartridge 200 including the memory element 202 mounted behind the label 220. Advantageously, the inclusion of the memory element 202 in the recess 210 does not alter the tape cartridge 204 nor prevent a label, such as the label 220, from also being retained within the recess 210. Rather, while it is not necessary according to the present invention to include the label 220 in the recess 210 with the memory element 202, the label 220 provides the added advantage of protecting the memory element 202 from damage during cartridge handling. Also advantageously, the memory element 202 is easily removable from the cartridge 200, by sliding the label 220, and memory element 202, out of the recess 210. Preferably, the label 220 and memory element 202 are separately securable in the recess and are not permanently affixed to one another (as by an adhesive) so as to permit separate addition, removal of, or replacement of the label 220 and memory element 202. Still yet another advantage of the present invention, is that tape cartridges, such as cartridge 200, can be retrofitted with the memory element 202 at any point in time. In other words, the memory element 202 may be included in the tape cartridge 200 by the cartridge manufacturer at the time of manufacturing, or subsequently added to the tape cartridge 200 at a latter date by the manufacturer or a customer. Those skilled in the art will appreciate the significant benefit this provides in relation to the quantity of tape cartridges on the market that do not include a memory element, but that could be easily retrofitted according to the principles of the present invention.

To exchange information with a tape-handling device, such as the tape drive 100, the memory element 202 comprises a thin flexible substrate with an antenna/transceiver 206 and a memory chip 208 formed thereon. The antenna/transceiver 206 may be any transceiver configured to exchange communications with the tape drive 100 via a wireless signal. In one preferred example, the memory chip 208 is a semiconductor memory device mounted on the substrate, while the antenna/transceiver 206 is a radio frequency transceiver including radio frequency circuitry that utilizes a plurality of conductive paths formed as circuit windings on the surface of the substrate. In this regard, the memory chip 208 utilizes the windings of the antenna/transceiver 206 to perform radio frequency power transfer and data communication with a mating antenna/transceiver 300 in the tape drive 100, without physical contact with the antenna/transceiver 300.

More particularly, when the cartridge 200 is inserted into the tape drive 100, the recess 210 containing the memory element 202 is positioned adjacent the antenna/transceiver 300. In this regard, the antenna/transceiver 300 comprises the primary windings of a transformer, while the antenna/transceiver 206 comprises the secondary windings of the transformer. The transformer, in turn, inductively exchanges signals, including data signals and power signals, between the memory element 202 and the tape drive 100. For example, when the antenna/transceiver 300 induces a signal into the windings of the antenna/transceiver 206, the windings deliver a signal to the memory chip 208 that may be used to write data to the memory chip 208. Similarly, the induced signal by the antenna/transceiver 300 is detectable by processing circuitry within the tape drive 100 to collect information provided by the antenna/transceiver 206, thereby passing information from the memory chip 208 to the tape drive 100.

The external mounting of the memory element 202 provides the additional advantage of improving communication between the cartridge 200 and the tape drive 100. In this regard, the external mounting of the memory element 202 positions the antenna/transceiver 206 closer to the mating antenna/transceiver 300, resulting in reduced signal fading during communication exchange. This in turn, results in reduced power requirements for communication exchange; thereby reducing electromagnetic interference in a tape-handling device, such as tape drive 100. Furthermore, the detachability of the memory element 202 provides significant advantage in that it is easily replaced in the event of damage without destruction of the cartridge 200.

Figure 4:
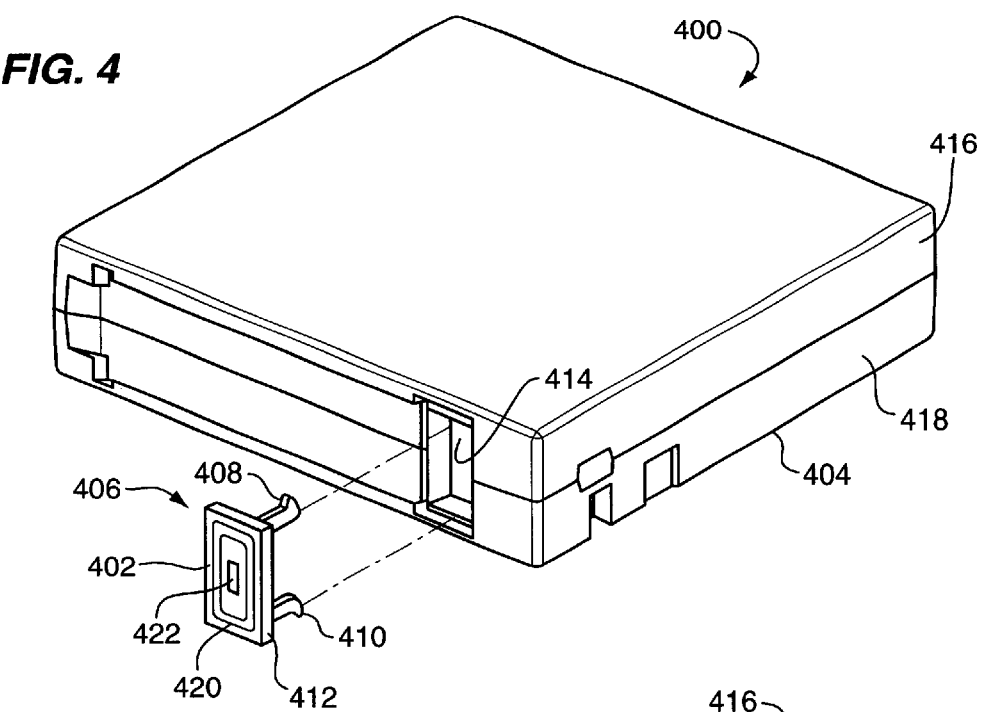
FIG. 4 illustrates another example of a tape cartridge including a memory element according to the principles of the present invention.
Figure 5:
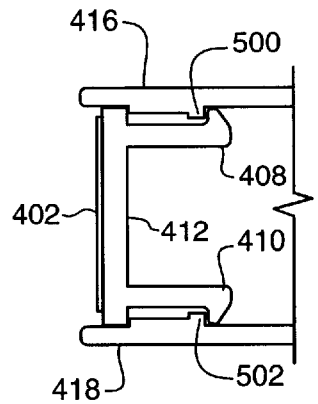
FIG. 5 is an example of the connection of an attachment apparatus according to the principles of the present invention.
Figure 6:
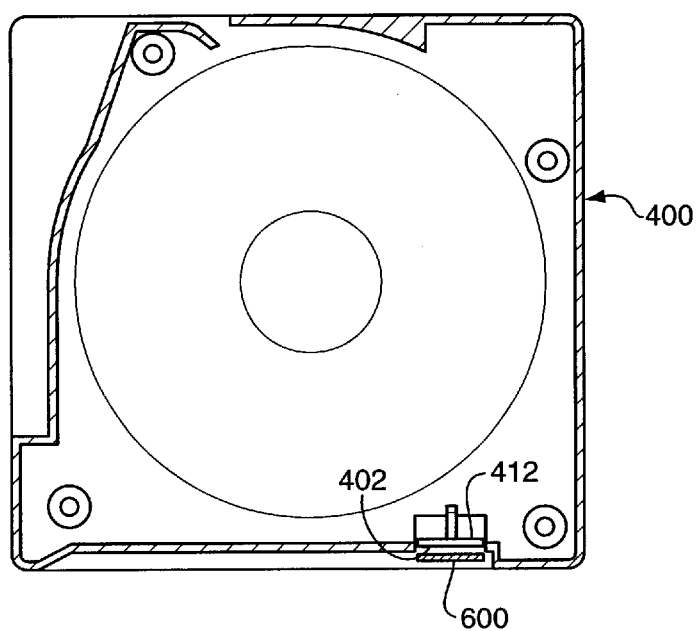
FIG. 6 is a top view of the tape cartridge of FIG. 4 in communication with a tape-handling device.

Referring to FIGS. 4–6, there is shown another embodiment of the tape cartridge 102, namely tape cartridge 400 including a memory element 402. Similar to the tape cartridge 200, the memory element 402 is detachably mountable to the tape cartridge housing 404 of the tape cartridge 400. In this regard, the memory element 402 may be mounted at any appropriate location on the tape cartridge housing 404 to provide wireless exchange of information with a tape-handling device, such as the tape drive 100. In one exemplary example, the memory element 402 is mounted on an attachment apparatus 406 that detachably connects the memory element 402 to the tape cartridge housing 404. The attachment apparatus 406 includes a pair of connectors, 408 and 410, integrally formed on a support structure 412. The connectors, 408 and 410, are designed to mate with an aperture 414 formed by mating halves, 416 and 418, of the tape cartridge housing 404.

Referring also to FIG. 5, the connectors, 408 and 410, are retained within the aperture 414 by a first feature 500 formed internal to the cartridge half 416 and a second feature 502 formed internal to the cartridge half 418. In this regard, the connectors, 408 and 410, flex during insertion into the aperture 414 and snap into position behind the features, 500 and 502, thereby securing the attachment apparatus 406 and memory element 402 to cartridge housing 404 in a detachable manner. Preferably, when the memory element 402 is connected to the cartridge housing 404, the memory element 402 is slightly recessed within the aperture 414 to protect the memory element 402 during cartridge handling. Alternatively, however, the memory element 402 may be connected substantially flush with the cartridge housing 404 to conserve real estate within the interior of the tape cartridge 400.

As with the memory element 202, the memory element 402 exchanges information with tape-handling devices, such as tape drive 100. In this regard, the memory element 402 comprises a thin flexible substrate affixed in parallel relation to the surface of the support structure 412. The substrate includes an antenna/transceiver 420 and a memory chip 422 formed thereon. The antenna/transceiver 420 and memory chip 422 may be any transceiver configured to exchange information with the tape drive 100 via a wireless signal. As with the above embodiment, the memory chip 422 is preferably a semiconductor device mounted on the substrate, while the antenna/transceiver 420 is a radio frequency transceiver and circuitry that utilizes a plurality windings to perform radio frequency power transfer and data exchange with a mating antenna/transceiver 600, in the tape drive 100, without physical contact with the antenna/transceiver 600.

It should be noted that the present detachable memory element 402 may be included in a tape cartridge, such as cartridge 400, at the time of manufacture or may be added to the cartridge at a latter date. In this regard, the cartridge 400 may be manufactured to include a memory blank, which is essentially the attachment apparatus 406 without the memory element 402 attached thereon. Further, in this regard, if a memory is desired in the cartridge 400 at a latter date, the memory element 402 may be affixed to the memory blank or alternatively, the memory blank may be removed from the cartridge 400 and replaced by an attachment apparatus 406 that includes the memory element 402. Furthermore, the detachability of the memory element 402 provides significant advantage in that it is easily replaced in the event of damage without destruction of the cartridge 400.

Tape Cartridge Having Detachable Internal Memory Element

Figure 7:
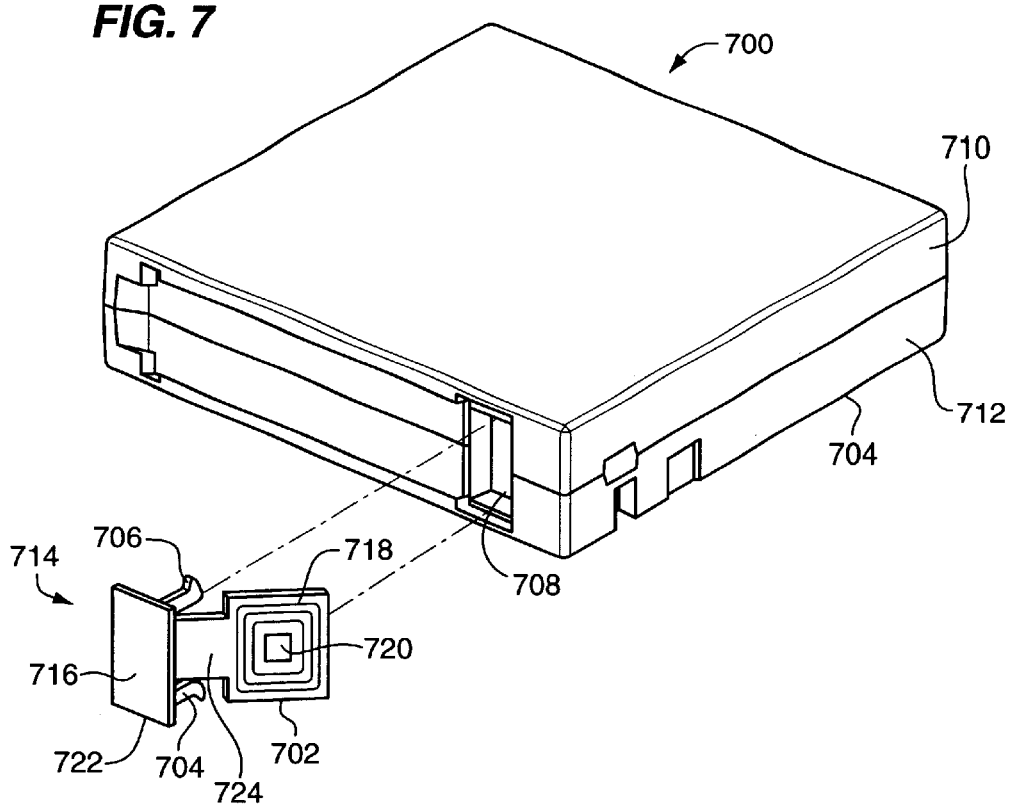
FIG. 7 is another example of a tape cartridge including a memory element according to the principles of the present invention.
Figure 8:
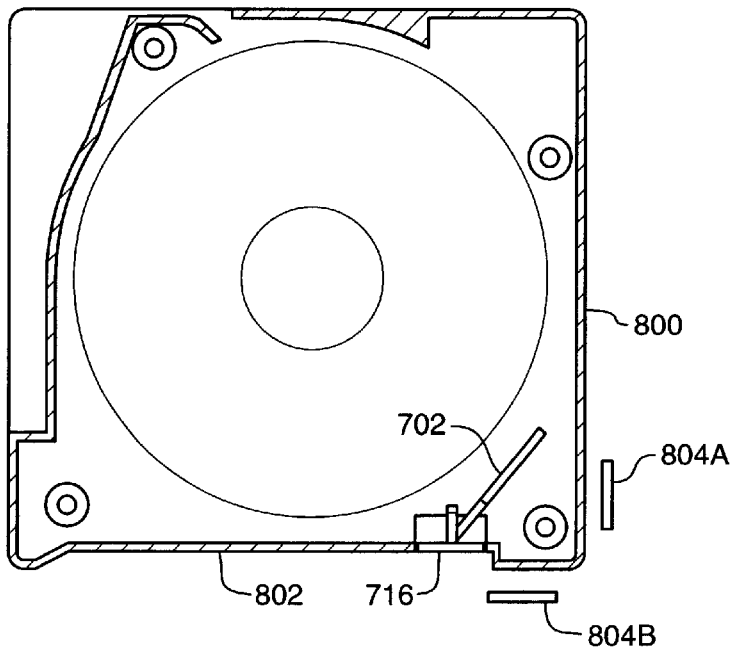
FIG. 8 is top view of the tape cartridge of FIG. 7 in communication with a tape-handling device.

Referring to FIGS. 7 and 8, there is shown another embodiment of the tape cartridge 102, namely tape cartridge 700 including a memory element 702. Similar to the tape cartridges, 200 and 400, the memory element 702 is detachably mountable to the tape cartridge housing 726 of the tape cartridge 700. In this characterization, however, the memory element 702 is mountable internal to the cartridge housing 726. In this regard, the memory element 702 is connected to an interior surface of an attachment apparatus 714 at a substantially forty-five-degree angle relative to a support structure 716 of the attachment apparatus 714. The attachment apparatus 714 further includes a pair of connectors, 704 and 706, connected to the support structure 716. As with the above embodiment, the connectors, 704 and 706, mate with an aperture 708 formed by mating halves, 710 and 712, of the tape cartridge housing 726. The connectors, 704 and 706, are substantially similar to connectors, 408 and 410, and are retained within the aperture 708 by a pair of features as exemplified by features 500 and 502 on FIG. 5.

The memory element 702 is similar to the memory elements, 202 and 402, in that it exchanges information with tape-handling devices, such as the tape drive 100 via a wireless connection. In this regard, the memory element 702 comprises a thin flexible substrate with an antenna/transceiver 718 and a memory chip 720 formed thereon. As with the above embodiment, the memory chip 720 is preferably a semiconductor device mounted on the substrate, while the antenna/transceiver 718 is a radio frequency transceiver and circuitry that utilizes a plurality windings to perform radio frequency power transfer and data exchange with a mating antenna/transceiver 804A or 804B in the tape drive 100, without physical contact with the mating antenna/transceiver 804A or 804B.

The connection of the memory element 702 to the attachment apparatus 714 at a forty-five-degree angle advantageously permits communication exchange with a mating antenna/transceiver of a tape-handling device via at least two sides of the tape cartridge 700. Specifically, when the attachment apparatus 714, including the memory element 702, is connected to the tape cartridge 700, the memory element 702 is positioned to communicate with an antenna/transceiver 804A adjacent to cartridge side 800 or with an antenna/transceiver 804B positioned adjacent to cartridge side 802. As with the above embodiment, the antenna/transceivers, 804A and 804B, may include the primary windings of a transformer that uses induction to exchange signals, including data signals and power signals, between the memory element 702 and the tape drive 100. In this regard, however, a tape-handling system, such as tape drive 100 would typically include only one of transceivers 804A and/or 804B. Advantageously, however, the present mounting of the memory element 702 provides additional flexibility in that it may be read by a tape-handling device having a transceiver such as antenna/transceiver 804A and/or antenna/transceiver 804B located adjacent to either cartridge side 800 or cartridge side 802.

As with the above embodiments, the memory element 702 is easily removed from the cartridge 700. In addition, the present detachable memory element 702 may be included in a tape cartridge, such as cartridge 700, at the time of manufacture or may be added to the cartridge at a latter date. In this regard, the cartridge 700 may be manufactured to include a memory blank, which is essentially the attachment apparatus 714 without the memory element 702 attached thereon. As with the above embodiment, if a memory is desired in the cartridge at a latter date, the memory element 702 may be affixed to the memory blank or alternatively, the memory blank may be removed from the cartridge 700 and replaced by an attachment apparatus 714 that includes the memory element 702. Furthermore, the detachability of the memory element 702 provides significant advantage in that it is easily replaced in the event of damage without destruction of the cartridge 700.

Tape Cartridge Having Detachable and Tunable Internal Memory Element

Figure 9:
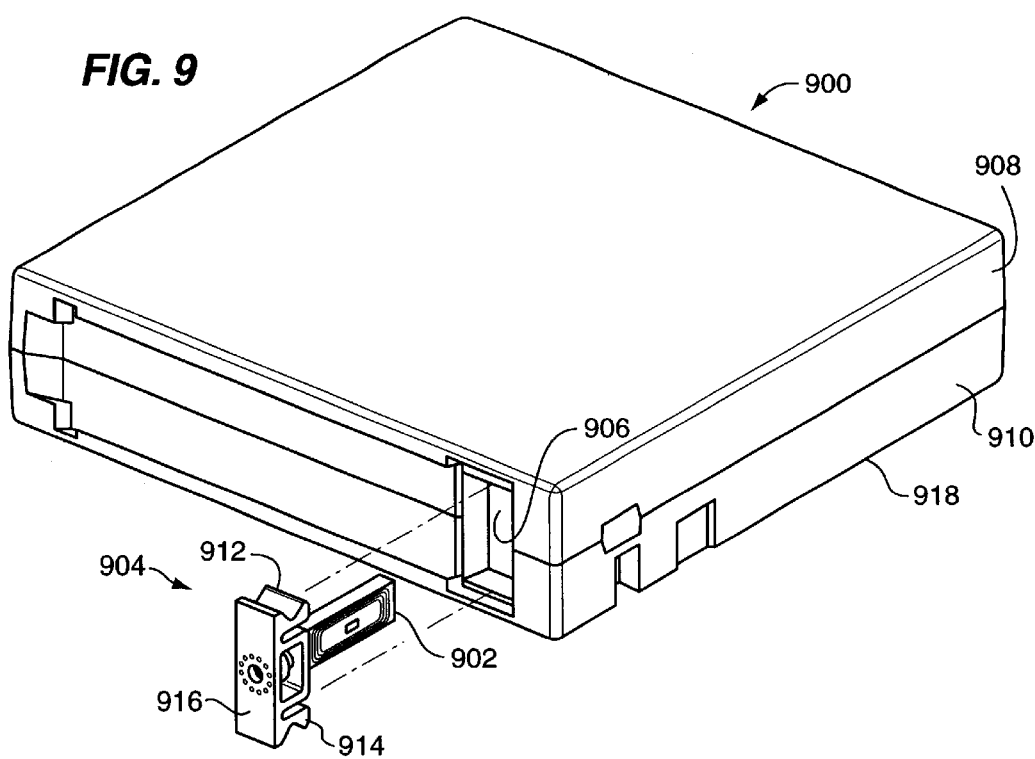
FIG. 9 is another example of a tape cartridge including a memory element according to the principles of the present invention.
Figure 10:
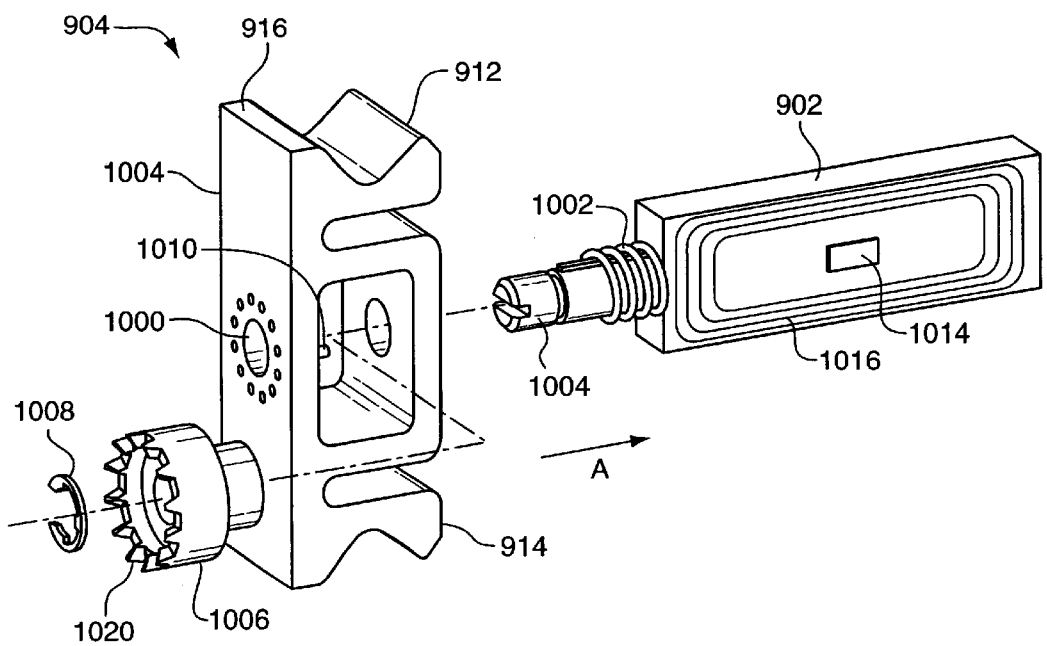
FIG. 10 is an example of an attachment apparatus including a positioning mechanism according to the principles of the present invention.
Figure 11:
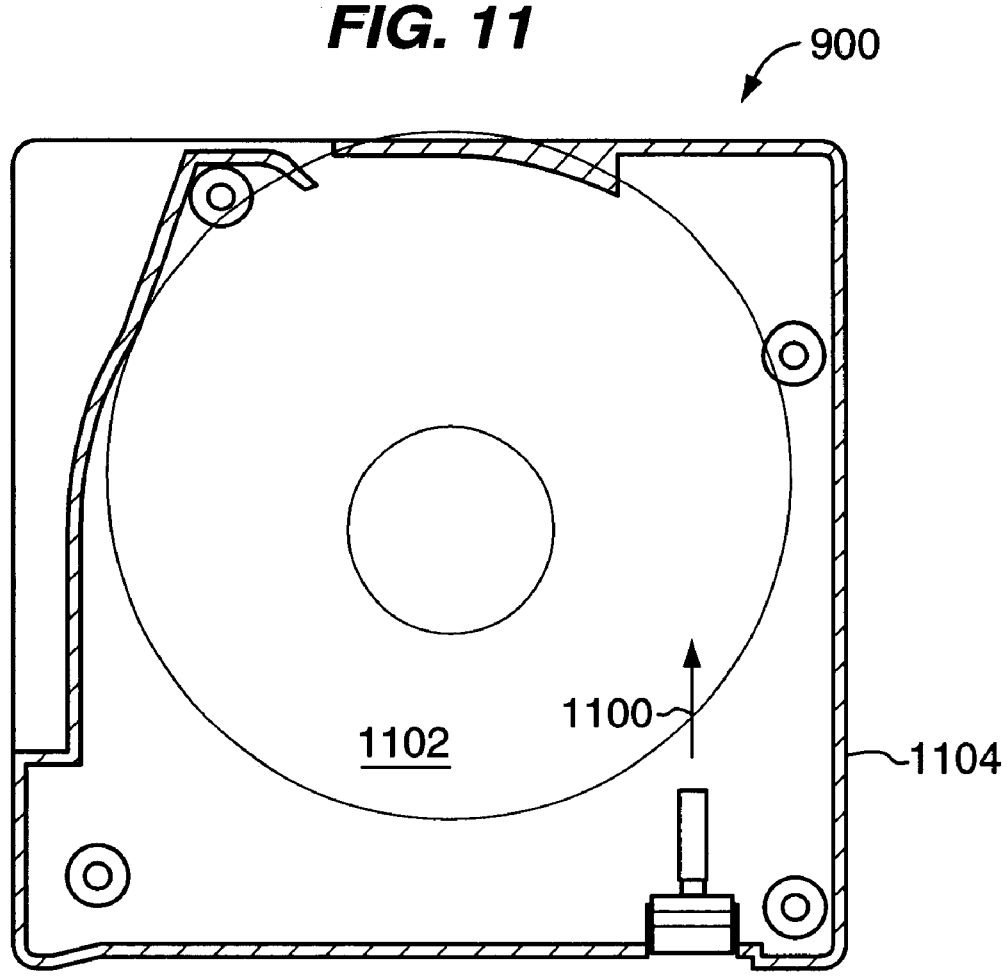
FIG. 11 is a top view of the attachment apparatus and positioning mechanism of FIG. 10 connected to a tape cartridge.
Figure 12:
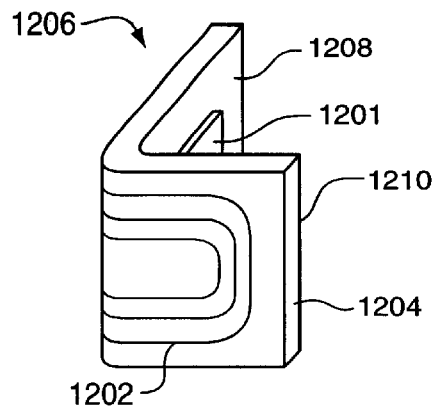
FIG. 12 is another example of a memory element according to the present invention.
Figure 13:
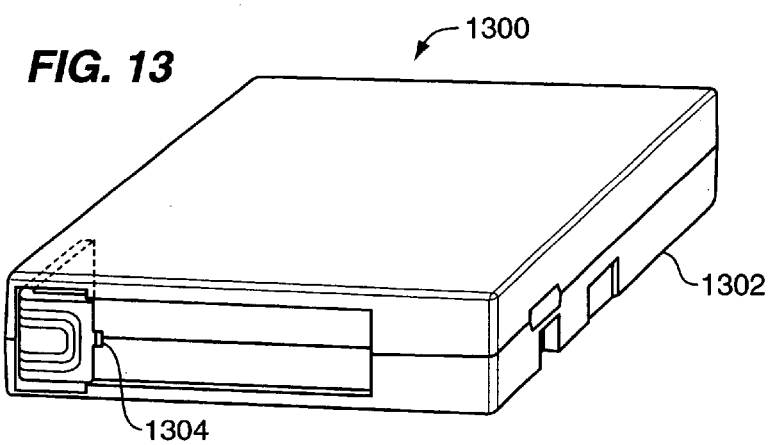
FIG. 13 is another example of a tape cartridge including the memory element of FIG. 12.
Figure 14:
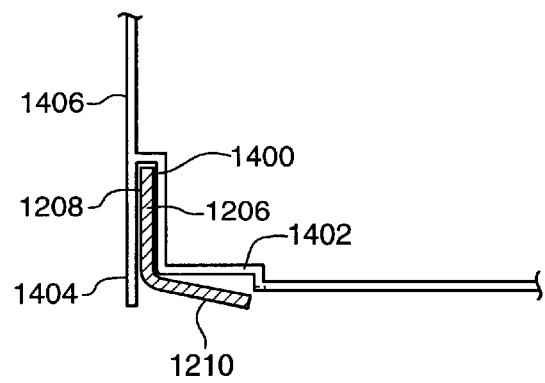
FIG. 14 is an example of the connection of the memory element of FIG. 12 to a tape cartridge.

Referring to FIGS. 9–11, there is shown another embodiment of the tape cartridge 102, namely tape cartridge 900 including a memory element 902. Similar to the tape cartridges 200, 400, and 700, the memory element 902 is detachably mountable to the tape cartridge housing 918 of the tape cartridge 900. In contrast, however, the tape cartridge 900 includes an internal memory element 902 that is both detachable and tunable with respect to the tape cartridge 900.

The memory element 902 is similar to the memory elements, 202, 402, and 702 in that it exchanges information with tape-handling devices, such as the tape drive 100 via a wireless connection. The memory element 902 comprises a thin flexible substrate with an antenna/transceiver 1016 and a memory chip 1014 formed thereon. As with the above embodiment, the memory chip 902 is preferably a semiconductor device mounted on the substrate, while the antenna/transceiver 1016 is a radio frequency transceiver and circuitry that utilizes a plurality windings to perform radio frequency power transfer and data exchange with a mating antenna/transceiver in the tape drive 100, without physical contact with the mating antenna/transceiver.

In this regard, the memory element 902 is mounted on an attachment apparatus 904 that detachably connects the memory element 902 to the tape cartridge 900. The attachment apparatus 904 also includes a means for a user to adjust the position of the memory element 902 after attachment to the cartridge 900 to improve communication with a tape-handling device, such as the tape drive 100. The attachment apparatus 904 includes a pair of connectors, 912 and 914, connected to a support structure 916. As with the above embodiment, the connectors, 912 and 914, mate with an aperture 906 formed by mating halves, 908 and 910, of the tape cartridge housing 918. The connectors, 912 and 914, are substantially similar to connectors, 502 and 504, and are retained within the aperture 906 by a pair of features as exemplified by features, 500 and 502, on FIG. 5.

As noted above, the attachment apparatus 904 also includes a means for aligning the memory element 902 with a respective read/write device, e.g. antenna/transceiver, in a tape-handling device, such as the tape drive 100. In this regard, the attachment apparatus 904 further includes a positioning mechanism. The positioning mechanism is connected to the memory element 902 and includes a shaft 1004 rotatably connected to the support structure 916. The shaft 1004 is externally accessible via aperture 1000 formed in support structure 916 to permit rotation of the shaft 1004, and thus the memory element 902, using a tool, such as a conventional screwdriver.

In this regard, the positioning mechanism further includes a toothed spindle 1006 connected to the shaft 1004 by a snap ring 1008. The spindle 1006 in turn, is biased upward by a spring 1002 to lock the spindle 1006 in place via a mating connection between teeth 1020, of the spindle 1006, and a flange 1010 formed on the underside of the support structure 916. Advantageously, the positioning mechanism permits a user to reposition the memory element 902 within the cartridge housing 918 to align the antenna/transceiver 1016 of the memory element 902 with a corresponding antenna/transceiver in a tape handling device, such as tape drive 100.

Further in this regard and with reference to FIG. 11, the positioning mechanism of the attachment apparatus 904 permits alignment of the memory element 902 with a cartridge top 1102, cartridge bottom (not shown), and/or cartridge side 1104, via rotation of the memory element 902 about the axis 1100. This in turn permits the cartridge 900 to be utilized in tape handling devices, such as the tape drive 100, having various different architectures, e.g. locations of a corresponding antenna/transceiver. In other words, the cartridge 900 may be utilized in a tape handling device having a corresponding transceiver positioned adjacent to any one of the cartridge top 1102, cartridge bottom, and/or cartridge side 1104 when the tape cartridge 900 is loaded therein.

In this regard, when repositioning of the memory element 902 is desired, pressure is applied on the shaft 1004 in the direction (A) to unlock the teeth 1020, of the spindle 1006, from the flange 1010 to allow rotation of the shaft 1004 and connected memory element 902. It should be noted that the teeth 1020 of the spindle 1006 may be configured to correspond to a specific degree of adjustment of the memory element 902. For instance, if the spindle 1006 is advanced one notch, e.g. the spindle 1006 is rotated via shaft 1004 so that the flange 1010 mates with an adjacent set of teeth, such advancement may correspond to a predetermined degree of rotation or positioning of the memory element 902. Those skilled in the art will appreciate that the teeth 1020 of the spindle 1006 may be configured in numerous different arrangements to achieve various degrees of rotation or positioning of the memory element 902 according to the present principles. For instance the teeth 1020, of the spindle 1006, may be configured to rotate the memory element 902 on the order of one to thirty degrees, and more preferably, on the order of five to fifteen-degrees. In this regard, the attachment apparatus 904 may further include indicia 1012 circumscribing aperture 1000 to indicate to a user the specific degrees and position of the memory element 902 in response to rotation of the shaft 1004.

Additionally, as with the above embodiments, the memory element 902 is easily removed from the cartridge 900 and may be included in a tape cartridge, such as cartridge 900, at the time of manufacture or may be added to the cartridge 900 at a latter date. In this regard, the cartridge 900 may be manufactured to include a memory blank, which is essentially the attachment apparatus 904 without the memory element 902 attached thereon. As with the above embodiments, if a memory is desired in the cartridge 900 at a latter date, the memory element 902 may be affixed to the memory blank or alternatively, the memory blank may be removed from the cartridge 900 and replaced by an attachment apparatus 904 that includes the memory element 902. Furthermore, the detachability of the memory element 902 provides significant advantage in that it is easily replaced in the event of damage without destruction of the cartridge 900.

Tape Cartridge Having Folded Memory Element

Referring to FIGS. 12–15, there is shown another embodiment of the tape cartridge 102, namely tape cartridge 1300 including a memory element 1206. Similar to the tape cartridges 200, 400, 700 and 900, the memory element 1206 is detachably mountable to the tape cartridge housing 1302 of the tape cartridge 1300.

The memory element 1206 is substantially similar to the memory elements, 202, 402, 702, and 902, in that it exchanges information with tape-handling devices, such as the tape drive 100 via a wireless connection. In this regard, the memory element 1206 comprises a thin flexible substrate with an antenna/transceiver 1202 and a memory chip 1201 formed thereon. As with the above embodiment, the memory chip 1201 is preferably a semiconductor device formed on the substrate, while the antenna/transceiver 1202 is a radio frequency transceiver and circuitry that utilizes a plurality windings to perform radio frequency power transfer and data exchange with a mating antenna/transceiver in the tape drive 100, without physical contact with the mating antenna/transceiver.

In contrast, however, the substrate 1204 of the memory element 1206 is formed or "folded" at a substantially ninety-degree angle so that the memory element 1206 may be inserted into a recess 1400 formed within a wall 1406 of the cartridge housing 1300. In this characterization, the memory element 1206 is retained in the recess 1400 so that a first side 1208 of the memory element 1206 is internally housed in the wall 1406 of the cartridge housing 1300, while a second side 1210 of the memory element 1206 is external to the cartridge housing 1300. Those skilled in the art will appreciate that the memory chip 1201 may be included on either the side 1208 of the memory element 1206 or on the side 1210 of the memory element 1206. Preferably, however, the memory chip 1201 is included on the side 1208 so that it is protected from damage within the recess 1400. In this regard, it should be noted that the plurality of windings of the antenna/transceiver 1203 are included on both the side 1208 and the side 1210 to permit communication exchange with the memory chip 1201 from both the cartridge front 1504 and the cartridge side 1500.

The memory element 1206 is retained within the recess 1400 via a snap fit with the recess 1400. More particularly, an edge of the side 1210 of the memory element 1206 snaps into a channel 1402 formed in the housing 1300 following insertion of the side 1208 of the memory element 1206 into the recess 1400. In this regard, during insertion, side 1210 may flex slightly outward to permit the edge of the side 1210 of the memory element 1206 to snap into the channel 1402.

As with the above embodiments, the memory element 1206 is detachable from the housing 1300 to facilitate easy replacement in the event of damage. Similarly, the cartridge 1300 may be manufactured with a memory blank in the place of the memory element 1206 and the memory element 1206 subsequently added to the cartridge 1300 at a latter date. To facilitate removal of the memory element 1206 the cartridge housing 1300 is configured with an indent 1304 adjacent to the recess 1400 to permit the memory element 1206 to be snapped out of the recess 1400.

Figure 15:
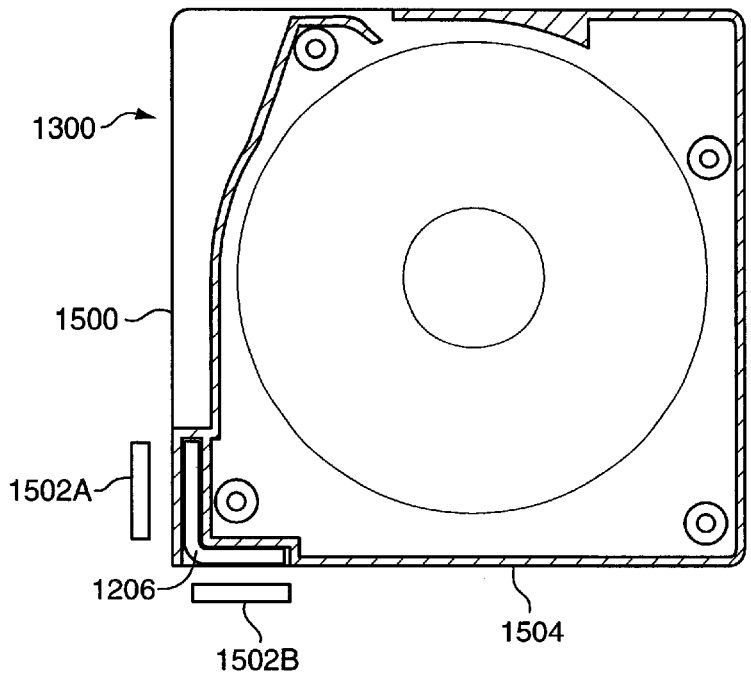
FIG. 15 is top view of the tape cartridge of FIG. 13 in communication with a tape-handling device.

As noted above, the folded memory element 1206 advantageously permits access to the memory chip 1201 from at least two sides of the tape cartridge 1300. In tape library applications this feature is of particular importance because library tape drives are often designed to access memory elements, such as element 1206 from the side 1500 of the cartridge 1200, while a library picker often requires access to a memory element, such as 1206, from the front 1504 of the cartridge 1200, as the cartridges are typically stored in a rack with only there front faces 1504 exposed to the picker. In this regard, the memory element 1206 is configured to communicate with a corresponding antenna/transceiver, e.g. antenna/transceivers 1502A and 1502B located adjacent to either the side 1500 or front 1504 of the cartridge 1300, as illustrated in FIG. 15. In addition, the memory element 1206 positions the antenna/transceiver 1202 adjacent to a mating tape-handling device antenna/transceiver, e.g. 1502A and/or 1502B resulting in reduced signal fading during communication exchange. This in turn, results in reduced power requirements for communication exchange; thereby reducing electromagnetic interference in a tape-handling device, such as tape drive 100.

Figure 16:
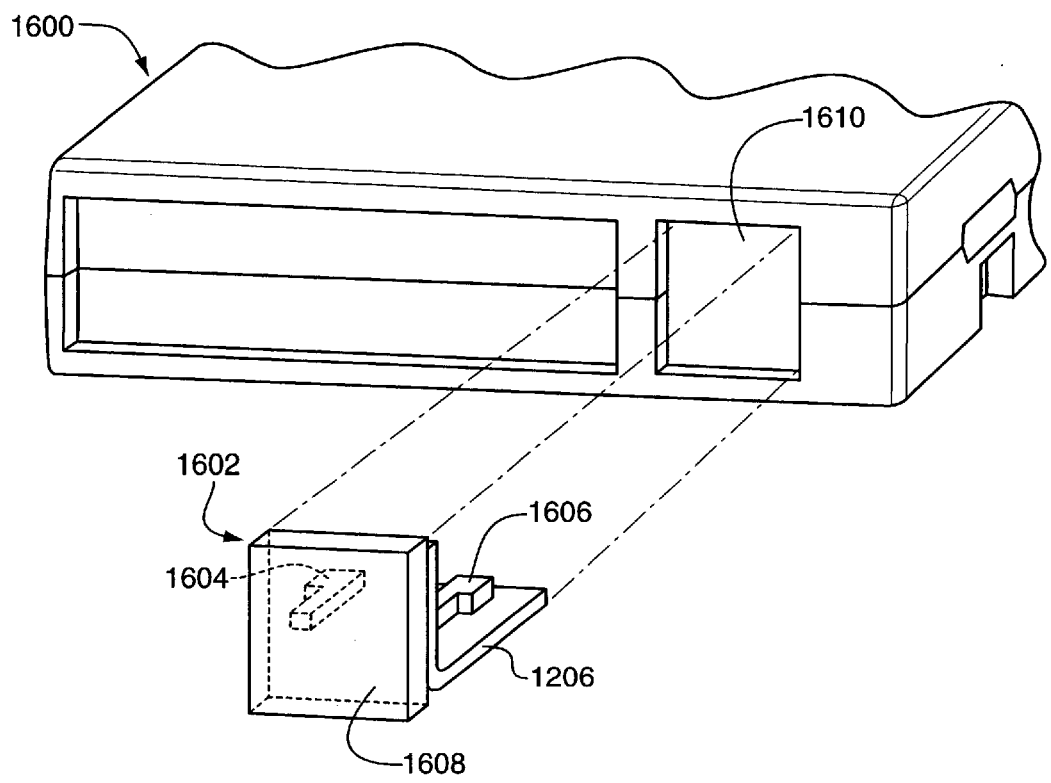
FIG. 16 is another example of a tape cartridge including a memory element according to the principles of the present invention.

Referring to FIG. 16, there is shown another embodiment of a tape cartridge 1600 including the memory element 1206 according to the present invention. In this characterization the memory element 1206 is combined with an attachment apparatus, namely apparatus 1602, to detachably connect the memory element 1206 to a tape cartridge, such as cartridge 1600.

The attachment apparatus 1602 includes a pair of connectors, 1604 and 1606, connected to a support structure 1608. As with the above embodiments, the connectors, 1604 and 1606, mate with an aperture 1610 in the housing of the cartridge 1600. The connectors, 1604 and 1606, are substantially similar to connectors, 502 and 504, and are retained within the aperture 1610 by a pair of features as exemplified by features, 500 and 502, on FIG. 5.

As with the above embodiments, the memory element 1206 is positioned within the tape cartridge 1600 so that it may exchange communications with a corresponding tape handling device antenna/transceiver from at least two sides of the tape cartridge 1600, as exemplified in FIG. 15. Furthermore, as with the above embodiments, the memory element 1206 is replaceable in the event of damage. Similarly, the memory element 1206 may be subsequently added to the tape cartridge 1600 after manufacturing via the use of a memory blank as described above.

Figure 17:
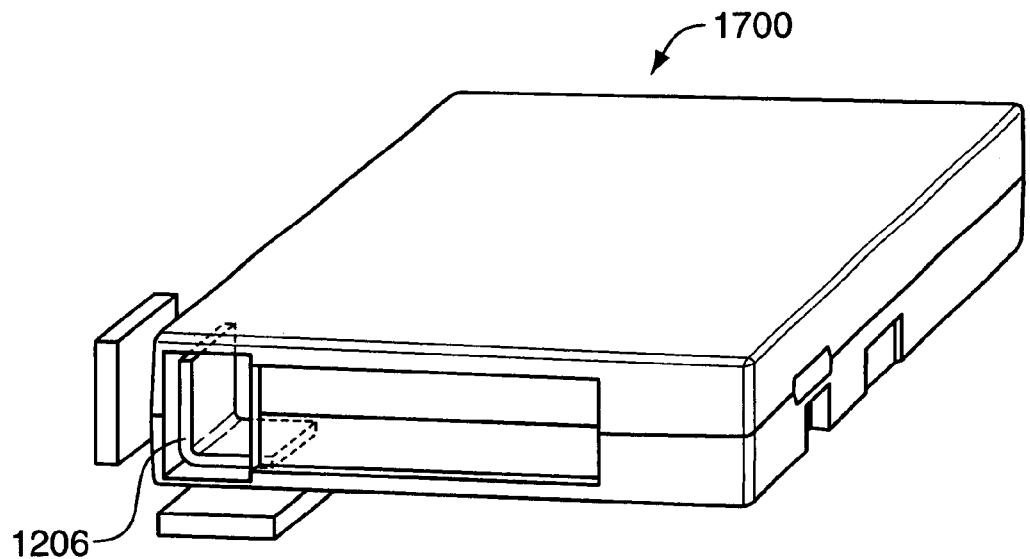
FIG. 17 is another example of a tape cartridge including a memory element according to the principles of the present invention.

Referring to FIG. 17 there is shown another embodiment of a tape cartridge 1700 including the memory element 1206 according to the present invention. In this characterization, however, the "folded" memory element 1206 is mounted internal to the cartridge 1700. As with the above embodiments, the memory element 1206 is positioned within the tape cartridge 1700 so that it may exchange communications with a corresponding tape handling device antenna/transceiver from at least two sides of the tape cartridge 1700, as exemplified in FIG. 15. In addition, the memory element 1206 positions the antenna/transceiver 1202 closer to a mating tape-handling device antenna/transceiver, resulting in reduced signal fading during communication exchange. This in turn, results in reduced power requirements and reduced electromagnetic interference in a tape-handling device, such as tape drive 100.

Figure 18:
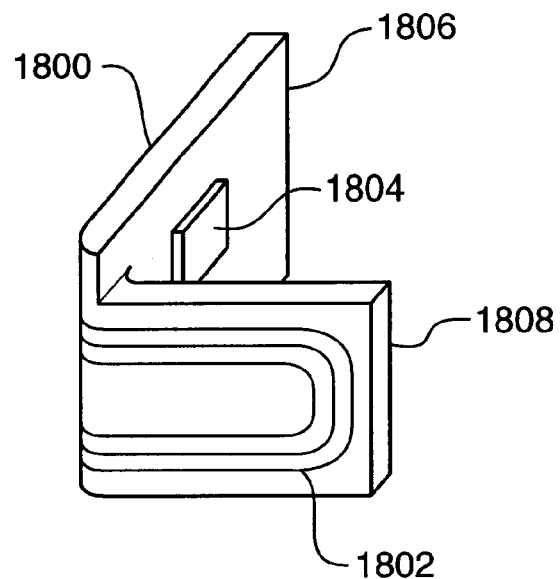
FIG. 18 is another example of a memory element according to the present invention.
Figure 19:
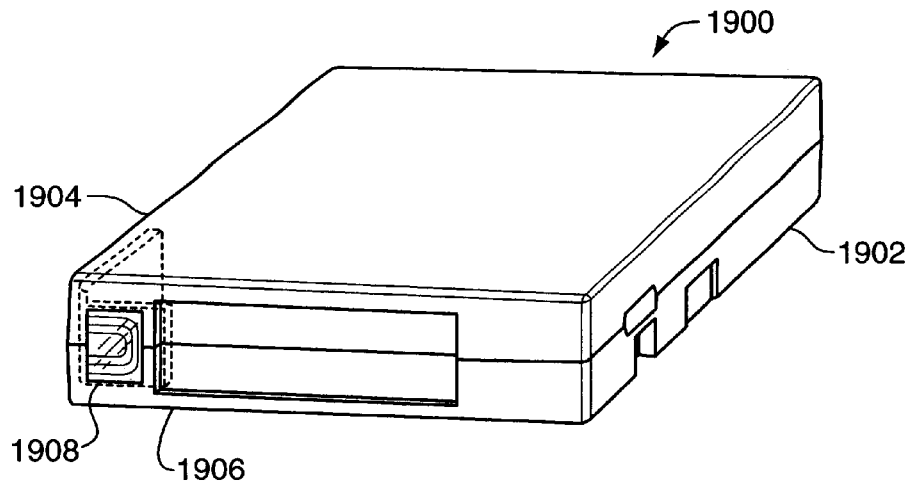
FIG. 19 is another example of a tape cartridge including the memory element of FIG. 18.
Figure 20:
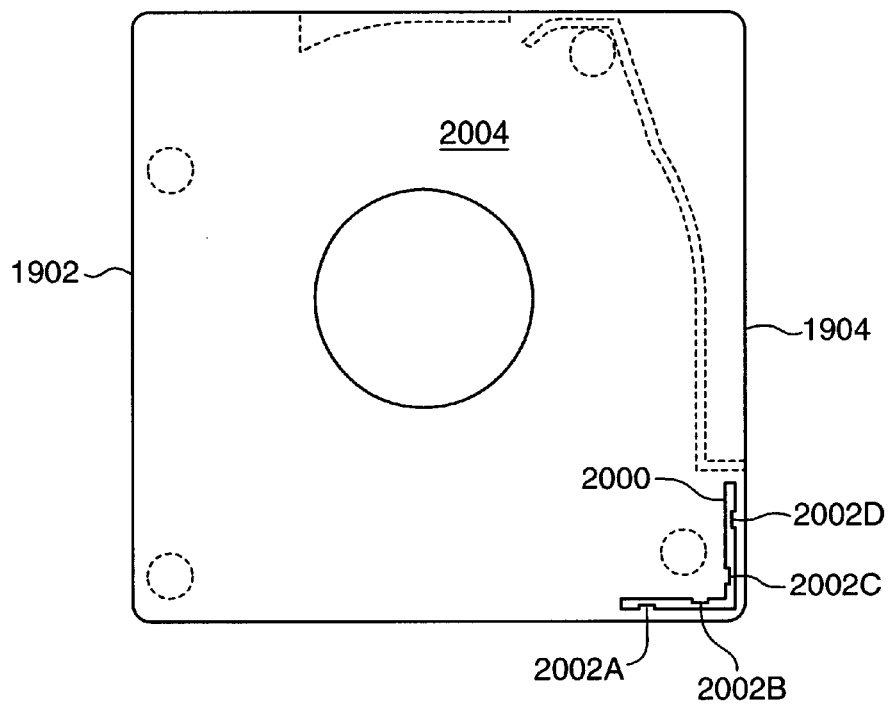
FIG. 20 is an example of the connection of the memory element of FIG. 18 to a tape cartridge.

Referring to FIGS. 18–20, there is shown another embodiment of the tape cartridge 102, namely tape cartridge 1900 including a memory element 1800. Similar to the tape cartridges 200, 400, 700, 900, 1300, and 1600 the memory element 1800 is detachably mountable to the tape cartridge housing 1902 of the tape cartridge 1900.

The memory element 1800 is substantially similar to the memory element 1206 in that it is a "folded" memory that exchanges information with tape-handling devices, such as the tape drive 100, via a wireless connection. In this regard, the memory element 1800 comprises a thin flexible substrate with an antenna/transceiver 1802 and a memory chip 1804 formed thereon. As with the above embodiment, the memory chip 1804 is preferably a semiconductor device formed on the substrate, while the antenna/transceiver 1802 is a radio frequency transceiver and circuitry that utilizes a plurality windings to perform radio frequency power transfer and data exchange with a mating antenna/transceiver in the tape drive 100, without physical contact with the mating antenna/transceiver.

In this embodiment, the memory element 1800 is retained partially within a wall 1904 of the cartridge housing 1902 and partially within a wall 1906 of the cartridge housing 1902. In this regard, the wall 1906 includes an aperture 1908 formed therein so that at least a portion of the side 1808 of the memory element 1800 is externally exposed relative to the cartridge housing 1902. Further, in this regard, the memory element 1800 is a "folded" memory element as described above configured for insertion through a slot 2000 formed in a bottom 2004 of the cartridge 1900. The slot 2000 is formed in the walls 1904 and 1906 of the cartridge housing, and is dimensioned to receive the memory element 1800 therein. The slot 2000 further includes a plurality of retainers, as exemplified by retainers 2002A–C, integrally formed within the slot 2000 to retain the memory element 1800 therein. Thus, the memory element 1800 is retained within the walls, 1904 and 1906, of the cartridge housing 1902 so that a first side 1806 of the memory element 1800 is internally housed in the wall 1904 forming a side of the cartridge housing 1902 and a second side 1808 of the memory element 1800 is retained within a wall 1906 forming the front of the cartridge housing 1902.

As with the above embodiments, the folded memory element 1800 advantageously permits access to the memory chip 1804 from at least two sides of the tape cartridge 1900. In this regard, the side 1808 of the memory element 1800 includes a smaller cross sectional area relative to the side 1806 of the memory element 1800. This results in a smaller antenna/transceiver portion 1802 being included on the side 1808 of the memory element 1800 to reduce RF transmission from the front side 1906 of the tape cartridge 1900.

As noted above, in a tape library system, the library tape drive is most often designed to access memory elements, such as element 1800, from the side 1904 of the cartridge 1900, while the library picker accesses a memory element, such as element 1800, from the front side 1906 of the cartridge 1900. In this regard, when the tape cartridge 1900 is utilized in a library tape drive, the memory element 1800 will have reduced RF emissions from the side 1808 of the memory element 1800 when the side 1806 of the memory element is charged by a mating antenna/transceiver in the library drive. Such reduced emissions from the side 1808 of the memory element 1800 are desirable as such emissions may escape from the tape drive via the cartridge receiver 106, e.g. the front opening of the tape drive 100, where the tape cartridge 114 is loaded into the drive 100. Additionally, as with the above embodiments, the folded memory element 1800 also positions the antenna/transceiver 1802 closer to a mating tape-handling device antenna/transceiver to reduce signal fading during communication exchange. This in turn, results in reduced power requirements for communication exchange; thereby further reducing electromagnetic interference in a tape-handling device, such as tape drive 100.

Furthermore, it will be appreciated that the memory chip 1804 may be included on either side 1808 or on side 1806 of the memory element 1800. Preferably, however, the memory chip 1804 is again included on the side 1806 to provide the maximum protection from damage, as at least a portion of the side 1808 is externally exposed via aperture 1908. Additionally, as with the above embodiments, the memory element 1800 is detachable from the housing 1902 to facilitate easy replacement in the event of damage. Similarly, the cartridge 1900 may be initially manufactured without the memory element 1800 and the memory element 1800 subsequently added to the cartridge 1900 at a latter date.

As noted above, the folded memory element 1800 advantageously permits access to the memory chip 1804 from at least two sides of the tape cartridge 1900. In this regard, the memory element 1800 is configured to communicate with a corresponding antenna/transceiver located adjacent to either the side 1904 or the front 1906 of the cartridge 1900. In addition, the folded memory element 1800 positions the antenna/transceiver 1802 closer to a mating tape-handling device antenna/transceiver, resulting in reduced signal fading during communication exchange. This in turn, results in reduced power requirements for communication exchange; thereby reducing electromagnetic interference in a tape-handling device, such as tape drive 100.

Referring to FIGS. 21A–21I, various embodiments of a folded memory element are shown. As discussed above, it is useful to provide a memory element that has a transceiver or antenna element that can communicate via two or more faces of a cartridge. In particular, it is useful to provide one or more antenna elements that can communicate via a first face of the cartridge with a transceiver of a first tape-handling device such as a tape drive and via another face of the cartridge with another tape handling device such as a library picker. In order to accommodate a variety of geometries in this regard, it may be useful to properly position the antenna or antennae for optimum communication.

Figure 21A:
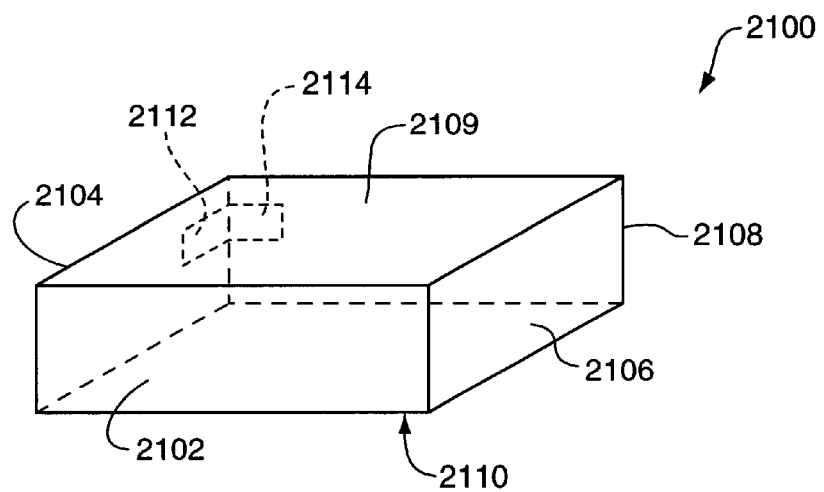
FIGS. 21A–21I show additional examples of memory elements according to the present invention for improved reading and/or writing via two cartridge faces.
Figure 21B:
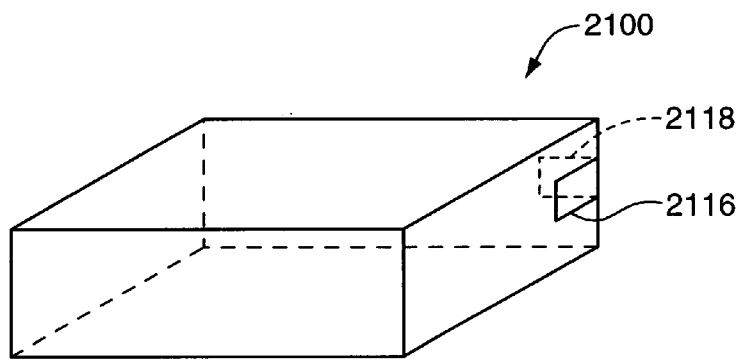
Figure 21C:
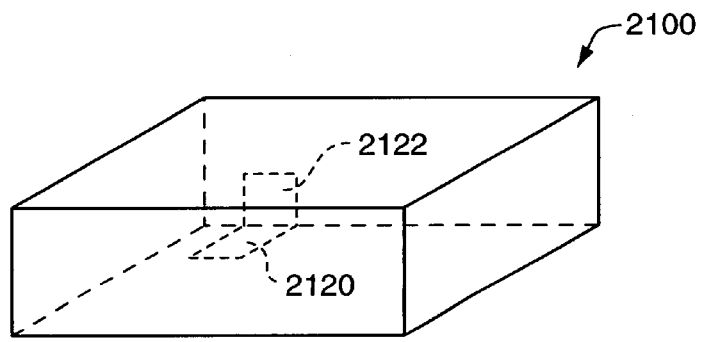
Figure 21D:
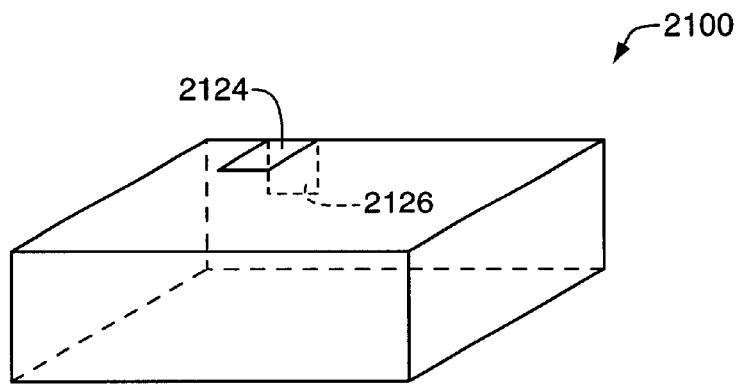
Figure 21E:
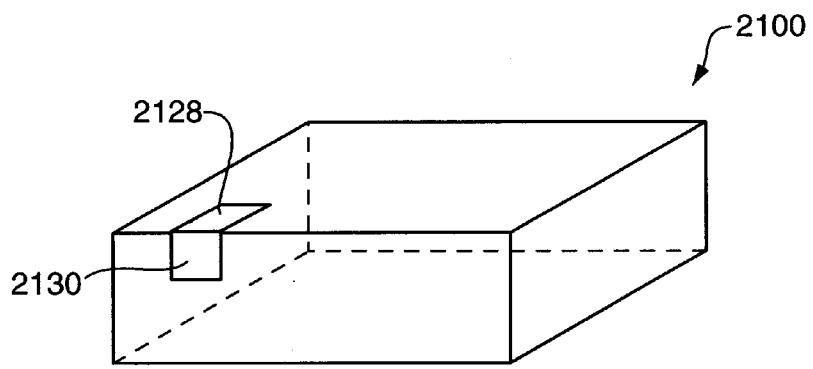
Figure 21F:
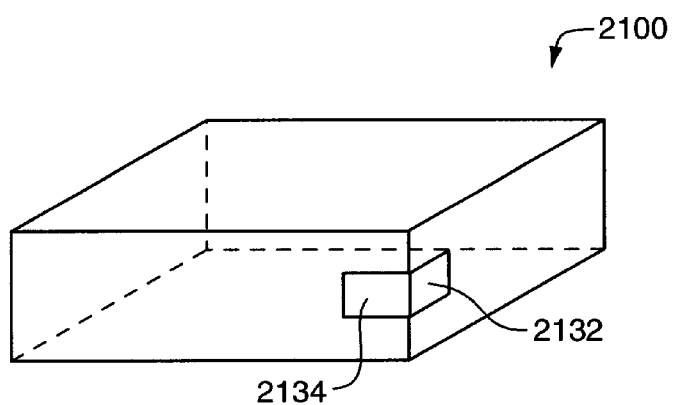

Referring to FIG. 21A, the illustrated tape cartridge 2100 includes a front face 2102, and rear face, 2108, two side faces 2104 and 2106, a top face 2109 and a bottom face 2110. Although these faces are not labeled in each of FIGS. 21B–21I, it will be appreciated that the same cartridge orientation is depicted in each of these figures. As shown in FIG. 21A, the folded memory element includes a first portion 2112 disposed on side face 2104 and a second portion 2114 disposed on rear face 2108. In FIG. 21B, the folded memory element includes a first portion 2116 disposed on side face 2106 and a second portion 2118 disposed on rear face 2108. In FIG. 21C, the folded memory element includes a first portion 2120 disposed on bottom face 2110 and a second portion 2122 disposed on rear face 2108. In FIG. 21D, the folded element includes a first portion 2124 disposed on the top face 2109 and a second portion 2126 disposed on the rear face 2108. The folded memory element of FIG. 21E includes a first portion 2128 disposed on the top face 2109 and a second portion 2130 disposed on the front face 2102. FIG. 21F shows a folded memory element with a first portion 2132 disposed on side face 2106 and a second portion 2134 disposed on front face 2102.

Figure 21G:
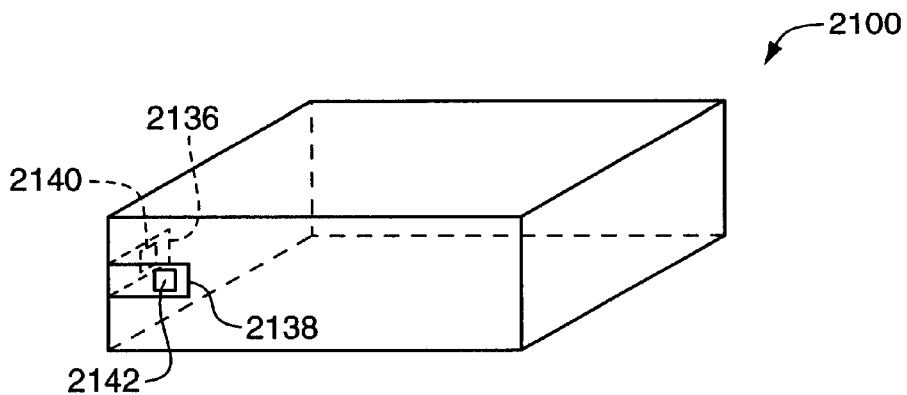

FIG. 21G shows a memory element including multiple antennae disposed on different faces of the cartridge 2100. The multiple antennae are preferably mounted on a common support structure so as to simplify assembly and facilitate proper alignment of the multiple antennae. Specifically, as shown in FIG. 21G, the folded memory element includes a first portion 2136 disposed on a first side face of the cartridge 2100 and a second portion 2138 disposed on a front face of the cartridge 2100. The first portion 2136 includes a first antenna 2140 and the second portion 2138 includes a second antenna 2142. It will be appreciated that this folded memory element can be easily mounted within a mating slot of the cartridge 2100 in a single assembly step and the folded configuration of the memory element structure will serve to automatically align the antennae, 2140 and 2142, to the desired location relative to, for example, the transceiver locations of the expected tape handling devices.

Figure 21H:
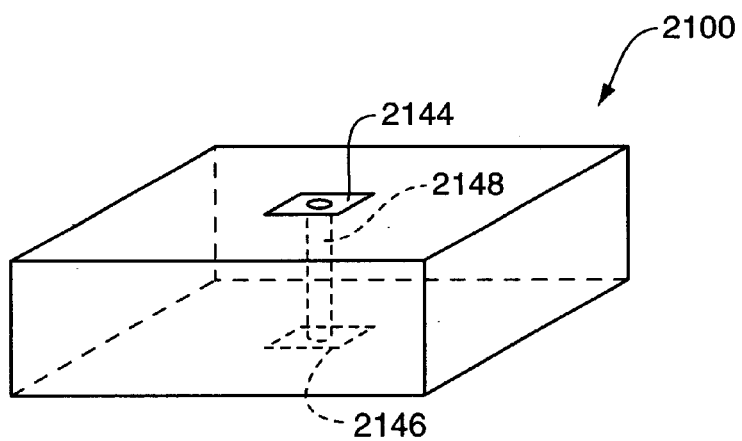

FIG. 21H shows an example of a memory element including antennae or transceivers disposed on multiple, non-adjacent faces of the cartridge. The illustrated embodiment of the memory element includes a first portion 2144 disposed on the top face and a second portion 2146 disposed on the bottom face. The first and second portions, 2144 and 2146, are interconnected via a post 2148 so as to provide a common support structure and maintain the proper positioning of the first and second elements 2144 and 2146 without necessarily requiring bonding to the cartridge faces. For example, the post 2148 may be disposed coincident with or proximate to a rotational axis of the tape housed within the cartridge and may be incorporated into the spindle design.

Figure 21I:
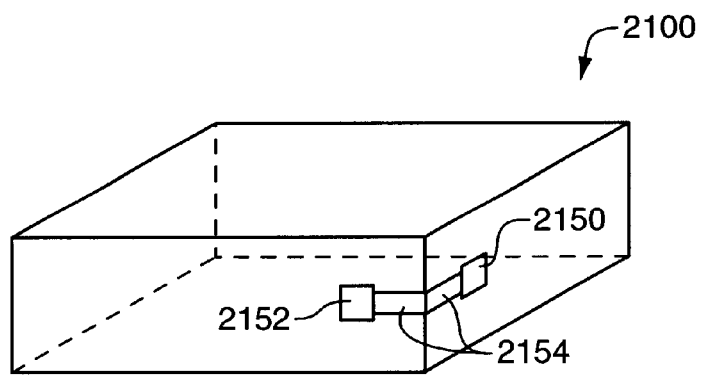

FIG. 21I shows a further embodiment of a memory element including a first portion 2150 disposed on a first face of the cartridge 2100 and a second portion 2152 disposed on a front face of the cartridge 2100. Again, the portions 2150 and 2152 are disposed on a common support structure. In this case, the common support structure includes a number of connecting rods 2154. The portions 2150 and 2152 may thereby define a single or multiple antennae. It is thus seen that a continuous web of material need not define the common support structure.

Figure 22A:
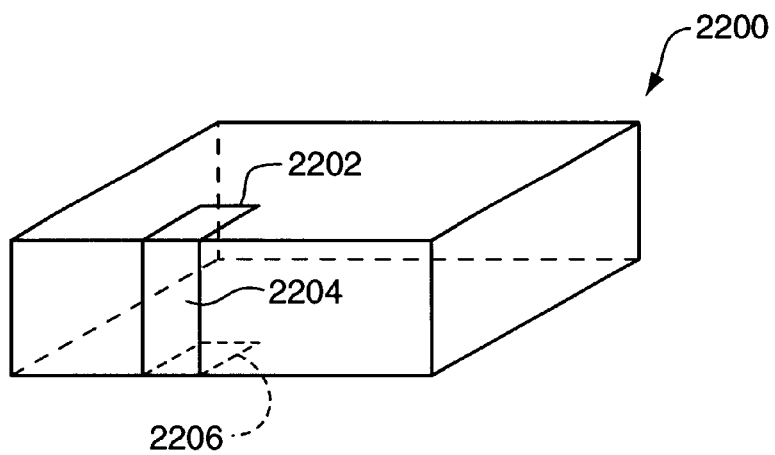
FIGS. 22A–22C show some exemplary implementations of a tape cartridge according to the present invention for reading and/or writing via more than two cartridge faces.
Figure 22B:
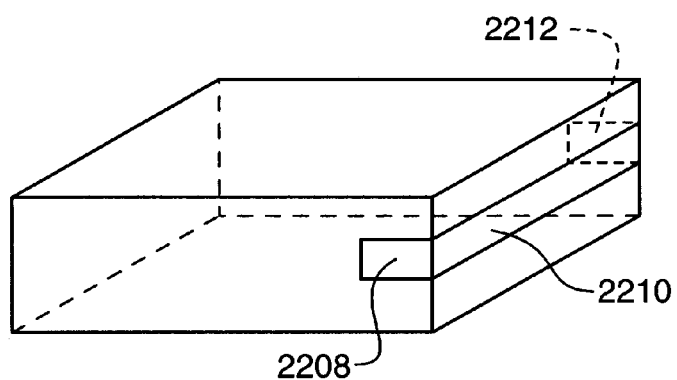
Figure 22C:
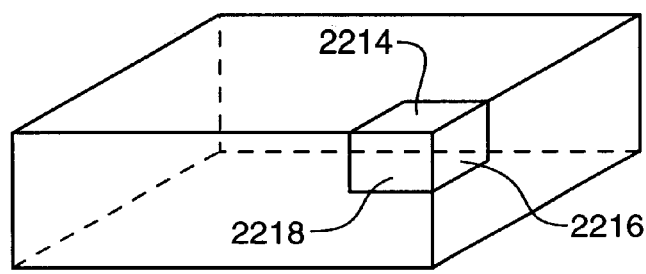

The embodiments described above have included a memory element associated with two faces of a cartridge so as to accommodate two different tape handling device configurations. It will be appreciated that it may be desirable to allow for communication with tape handling devices via more than two cartridge faces. For example, different tape drives and different library picker configurations may have different transceiver locations. In this regard, it may be desirable to provide a cartridge that can be used in different drives and in connection with different library implementations. FIGS. 22A–22C show examples of memory element configurations that can communicate via three cartridge faces. It will be readily appreciated that alternative implementations of three face memory cartridges and cartridges for communicating via more than three faces are possible.

In FIG. 22A, the memory element includes a first portion 2202 disposed on a top face of the cartridge 2200, a second portion 2204 disposed on a front face of the cartridge 2200 and a third portion 2206 disposed on a bottom surface of the cartridge. In FIG. 22B, the memory element includes a first portion 2208 disposed on a front face of the cartridge 2200, a second portion 2210 disposed on a side face of the cartridge and a third portion 2212 disposed on a rear face of the cartridge 2200. Finally, FIG. 22C shows a memory element that includes a first portion 2214 disposed on a top face of a cartridge, a second portion 2216 disposed on a side surface of the cartridge and a third portion 2218 disposed on a front surface of the cartridge. In each of these embodiments, the various portions may comprise a single or multiple antennae and are preferably mounted on a common support structure for ease of assembly and alignment. In addition, the various portions of the illustrated memory elements may share certain resources such as memory.

Figure 23A:
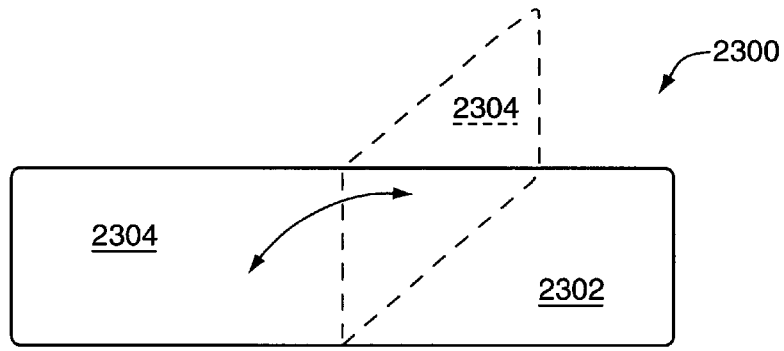
FIGS. 23A–23B show exemplary implementations of a folded memory element according to the present invention.
Figure 23B:
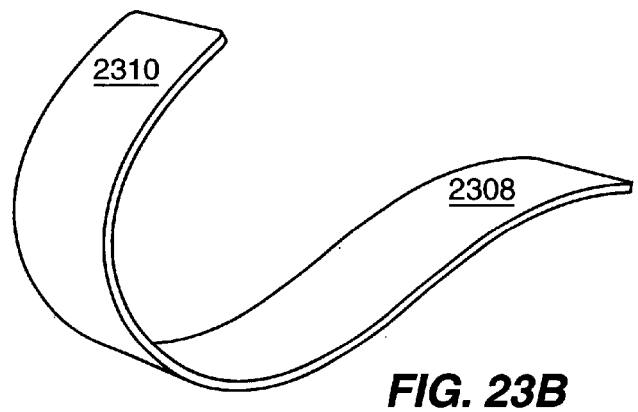
Figure 24A:
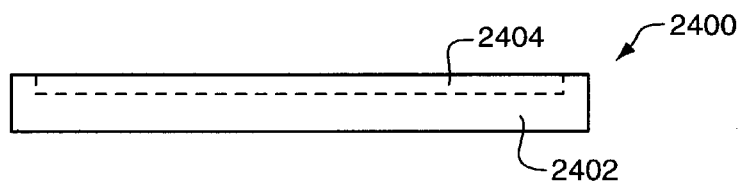
FIGS. 24A–24B show exemplary implementations of an antenna in connection with a support structure according to the present invention.
Figure 24B:
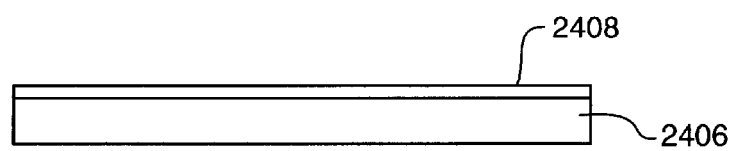

The discussion above has referred to folded memory devices. In many cases, it will be desirable to provide a substantially rigid memory device for ease of assembly. However, it is also possible to provide a flexible memory element, e.g., embodied in a flex circuit, which can be inserted into slots or similar structure of the cartridge so as to maintain a desired configuration upon assembly. In this regard, FIG. 23A illustrates a rigid or semi-rigid element 2300. The element 2300 includes a first portion 2302 for positioning on one face of a cartridge and a second portion 2304 for positioning on a second face of a cartridge. As shown, the memory element 2300 may be initially fabricated in a planar configuration and then folded into the desired folded configuration. It will be appreciated that appropriate fabrication are well known for enabling such post-fabrication folding without disabling the antenna. FIG. 23B shows a memory element 2306 embodied in a flex circuit. The element 2306 includes a first portion 2308 and a second portion 2310 for disposing on two faces of a cartridge upon assembly. It will be appreciated that the flex circuit thereby provides a common support structure for the portions 2308 and 2310. The final configuration may be defined by slots or other structure on the cartridge.

Figure 25A:
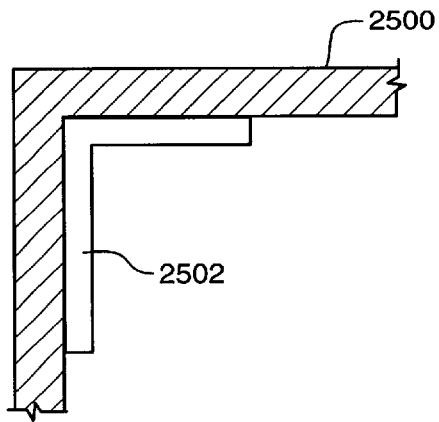
FIGS. 25A–25C illustrate alternative configurations of a memory element mounted onto cartridge faces according to the present invention.
Figure 25B:
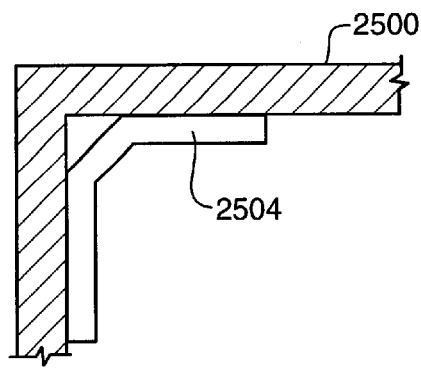
Figure 25C:
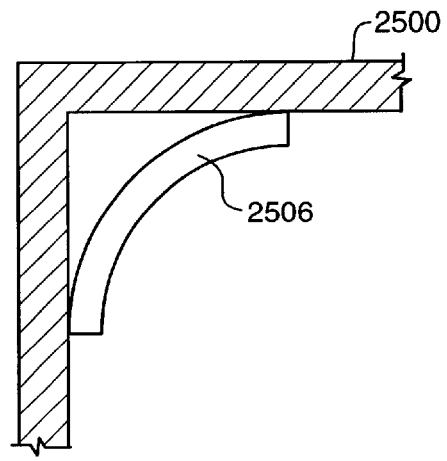

In the embodiments described above, the multi-face memory element has generally been illustrated as including planar portions that are bent at a right angle in order to provide antenna portions that are flush with the cartridge faces. Indeed, providing antenna portions that are flush with the cartridge faces may optimize communication by reducing the total distance between the memory element transceivers and the associated transceivers of the tape handling devices. However, it may be desirable to provide alternative configurations, for example, to accommodate other cartridge structure or to provide a greater range of transmission/receiving axes so as to simplify alignment. Various configurations in this regard are shown in FIGS. 25A–25C. In particular, FIG. 25A shows a simple case where the memory element 2502 is bent at a right angle to conform to a corner of the cartridge 2500. In FIG. 25B, the memory element 2504 includes an angled portion at the corner of the cartridge 2500. In FIG. 25C, the memory element 2506 generally has a curve around the corner of the cartridge 2500. Any of these configurations may be appropriate to provide the desired multi-face communication while accommodating cartridge structure and avoiding interference with the tape mounted within the cartridge. Moreover, it will be appreciated that any of these embodiments include transmission portions that are at small angles, e.g., less than forty-five degrees, relative to the associated cartridge faces and thereby provide potentially improved transmission characteristics.

With regard to all of the above embodiments including a removable memory element, it will be appreciated that data stored on the memory element may also be duplicated on the tape media within the cartridge to facilitate recovery in the event of damage to the memory element. Such data may not be accessed during normal cartridge operation, but only in the event that the memory element is permanently removed and/or replaced with a new memory element. In tape-handling devices requiring critical startup data, e.g. data mandatory for cartridge operation in a drive, a further advantage may be provided by storing a duplicate copy of such data on the tape media in that such data may be retrievable from both the media and the memory element such that the cartridge operates with or without the memory element. Further, in this regard, it will be appreciated that such startup data may in some cases not be stored on the memory element at all, but rather, only on the tape media. Those skilled in the art will appreciate variations of the above-described embodiments that fall within the scope of the invention. As a result, the invention is not limited to the specific examples and illustrations discussed above, but only by the following claims and their equivalents.

What is claimed:

1. A single reel tape cartridge, comprising:
   a cartridge housing;
   a supply reel rotatably connected within the cartridge housing and including a spool of magnetic tape media wound thereon;
   a memory element attached to the cartridge housing; and
   a positioning mechanism to reposition the memory element relative to the cartridge housing after attachment of the memory element to the cartridge housing.

2. The cartridge of claim 1 wherein the positioning mechanism permits a user to reposition the memory element relative to the cartridge housing to align the memory element with a corresponding transceiver in a tape handling device for wireless communication exchange between the memory element and the tape cartridge handling device.

3. The cartridge of claim 2 wherein the positioning mechanism comprises:
   an attachment apparatus to detachably connect the memory element to the cartridge housing.

4. The cartridge of claim 3 wherein the attachment apparatus and the positioning mechanism position the memory element to exchange the wireless communications between the memory element and the tape-handling device through a first and second side of the cartridge housing.

5. The cartridge of claim 3 wherein the positioning mechanism comprises:
   a rotating member having a proximate end disposed toward the attachment apparatus and a distal end connected to the memory element, wherein the rotating member is accessible by a user for application of a rotational force; and
   a spindle disposed between the proximal end and the distal end to releasably secure the rotating member to the attachment apparatus in a plurality of positions relative to the support structure.

6. The cartridge of claim 5 wherein the positioning mechanism comprises:
   a spring to releasably bias the spindle to the attachment apparatus.

7. The cartridge of claim 5 wherein the positioning mechanism comprises:
   a slot disposed on the proximate end to receive a tool for application of the rotational force.

8. The cartridge of claim 3 wherein the attachment apparatus comprises:
   a support structure for attachment of the positioning mechanism; and
   at least one connector on the support structure to detachably mate with a feature on the cartridge housing.

9. The cartridge of claim 8 wherein the attachment apparatus comprises:
   a pair of connectors on the support structure to detachably mate with a pair of features on the cartridge housing.

10. The cartridge of claim 8 wherein the support structure comprises:
    an indicator to provide memory element position information to the user during the repositioning of the memory element.

11. The cartridge of claim 2 wherein the memory element comprises:
    a substrate;
    a memory chip formed on the substrate; and
    an antenna/transceiver formed on the substrate to exchange the wireless communications between the memory chip and the tape-handling device.

12. The cartridge of claim 2 wherein the memory element is internally connected to the tape cartridge housing.

13. A method for providing a memory element in a single reel tape cartridge, the method comprising the steps of:
    connecting a wireless memory element to a tape cartridge housing;
    subsequent to the connecting step, repositioning the memory element relative to the cartridge housing with a positioning mechanism to align the memory element with a transceiver in a tape handling device; and
    exchanging wireless communications between the memory element and the tape-handling device.

14. The method of claim 13 comprising the step of:

subsequent to the exchanging step, again repositioning the memory element relative to the cartridge housing to align the memory element with a second transceiver in a second tape handling device.

15. The method of claim 13 wherein the connecting step comprises:

using the positioning mechanism to detachably connect the memory element to the tape cartridge housing.

16. The method of claim 15 wherein the repositioning step comprises:

accessing a rotating member of the positioning mechanism from a position external to the cartridge housing; and applying a rotational force on the rotating member to rotate the rotating member and connected memory element.

17. The method of claim 14 wherein the repositioning step comprises:

receiving memory element position information from an indicator on the positioning mechanism.

* * * * *